(12) United States Patent
Namiki

(10) Patent No.: US 7,040,085 B2
(45) Date of Patent: May 9, 2006

(54) DETERIORATION DETECTING DEVICE FOR OXYGEN CONCENTRATION SENSOR

(75) Inventor: Hidetoshi Namiki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 94 days.

(21) Appl. No.: 10/819,299

(22) Filed: Apr. 7, 2004

(65) Prior Publication Data
US 2004/0211168 A1   Oct. 28, 2004

(30) Foreign Application Priority Data
Apr. 23, 2003   (JP) .............................. 2003-117780

(51) Int. Cl.
*F01N 3/00* (2006.01)
(52) U.S. Cl. .............................. 60/277; 60/274; 60/276
(58) Field of Classification Search .................. 60/274, 60/276, 277, 285; 73/23.31, 23.32, 118.1
See application file for complete search history.

(56) References Cited

U.S. PATENT DOCUMENTS

| | | | | |
|---|---|---|---|---|
| 5,154,054 A | * | 10/1992 | Nakane et al. | 60/276 |
| 5,363,647 A | * | 11/1994 | Ohuchi et al. | 60/277 |
| 5,375,416 A | * | 12/1994 | Iwata et al. | 60/277 |
| 5,426,937 A | * | 6/1995 | Ohuchi et al. | 60/277 |
| 5,438,827 A | * | 8/1995 | Ohuchi et al. | 60/276 |
| 5,636,514 A | * | 6/1997 | Seki | 60/277 |
| 5,743,082 A | * | 4/1998 | Matsumoto et al. | 60/274 |
| 6,467,256 B1 | * | 10/2002 | Hashimoto | 60/277 |
| 6,698,187 B1 | * | 3/2004 | Nishioka et al. | 60/277 |
| 2002/0007627 A1 | * | 1/2002 | Hashimoto | 60/277 |

FOREIGN PATENT DOCUMENTS

JP    10-169494    6/1998

* cited by examiner

*Primary Examiner*—Thomas Denion
*Assistant Examiner*—Diem Tran
(74) *Attorney, Agent, or Firm*—Arent Fox PLLC

(57) ABSTRACT

Detecting deterioration of an oxygen concentration sensor disposed downstream of a catalyst. The air-fuel ratio is set to a rich air-fuel ratio, and then changed to a lean air-fuel ratio after an enrichment time period elapaes from the time of enrichment. A determination threshold is set according to a dead time period from the time the air-fuel ratio has been changed to the lean air-fuel ratio to the time the output from the oxygen concentration sensor reaches a first value. A change time period from the time the output from the oxygen concentration sensor reaches the first value to the time the output from the oxygen concentration sensor reaches a second value indicative of an oxygen concentration higher than an oxygen concentration corresponding to the first value, is measured. The oxygen concentration sensor is determined to be deteriorated when the change time period is greater than the determination threshold.

12 Claims, 14 Drawing Sheets

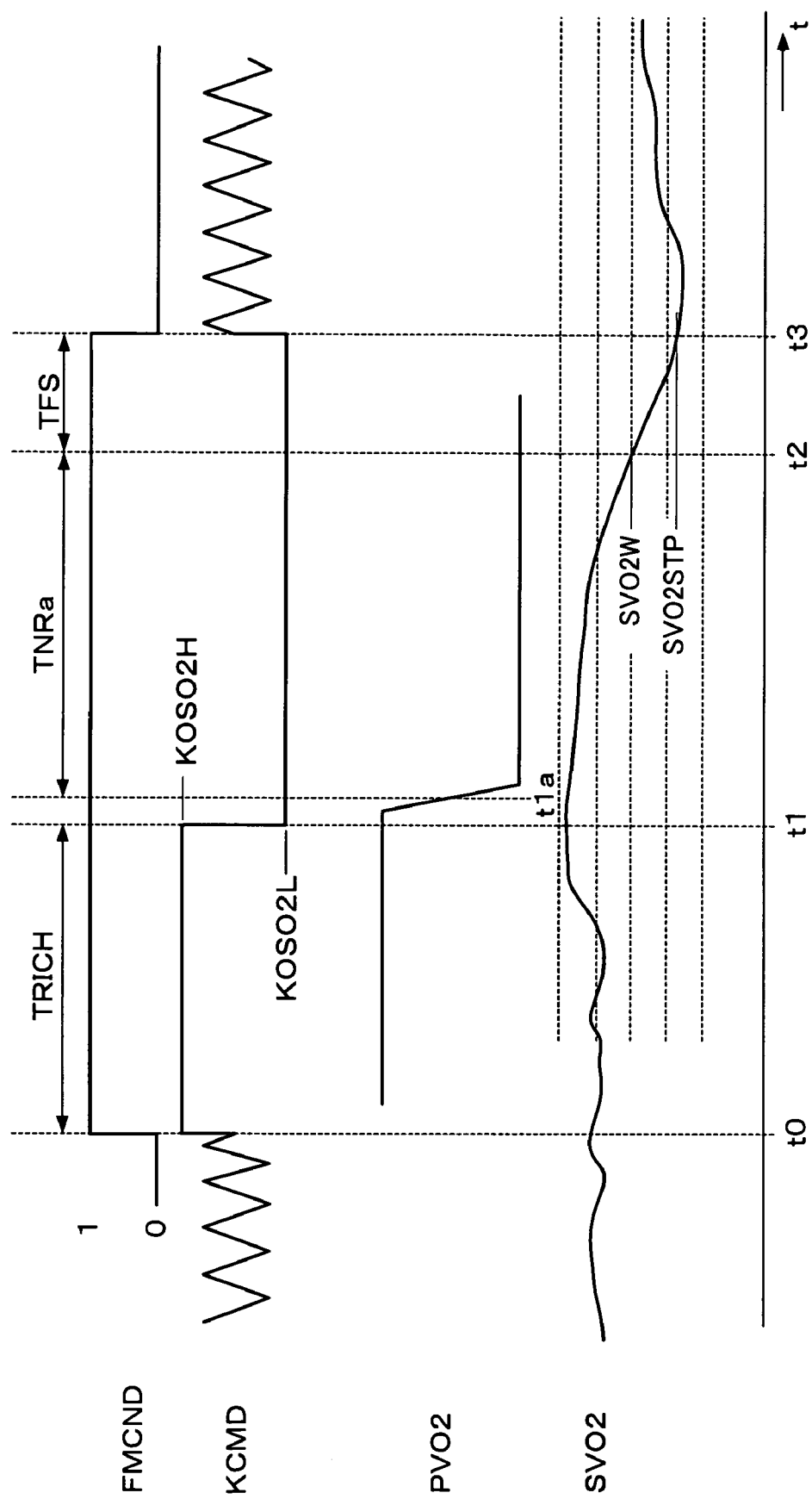

DETERIORATION DETECTING DEVICE FOR OXYGEN CONCENTRATION SENSOR

BACKGROUND OF THE INVENTION

1. Field of the Invention

The present invention relates to a deterioration detecting device for an oxygen concentration sensor disposed downstream of a catalyst, which is provided in an exhaust passage of an internal combustion engine to purify exhaust gases.

2. Description of the Related Art

A catalyst for purifying exhaust gases is provided in an exhaust passage of an internal combustion engine to perform purification of the exhaust gases. Further, an oxygen concentration sensor (which sensor will be hereinafter referred to as "downstream oxygen concentration sensor") is disposed downstream of the catalyst for purifying exhaust gases. Conventionally known is a system which performs deterioration determination of the catalyst according to a detection signal from the downstream oxygen concentration sensor, and also performs air-fuel ratio control for utilizing maximum purifying ability of the catalyst.

If the downstream oxygen concentration sensor is deteriorated, the deterioration determination of the catalyst and the air-fuel ratio control cannot be properly performed. Therefore, various methods for determining deterioration of the downstream oxygen concentration sensor have been proposed. One example of the proposed methods is described in Japanese Patent Laid-open No. Hei 10-169494. According to this method, when a target air-fuel ratio is changed from a rich air-fuel ratio to a lean air-fuel ratio, the time period (output change time period) from the time the output from the downstream oxygen concentration sensor starts to change from a rich region to a lean region to the time the amount of change in the output from the sensor becomes a predetermined amount, is detected. When this output change time period is greater than or equal to a predetermined time period, it is determined that the downstream oxygen concentration sensor is deteriorated.

In this determination method, the predetermined time period used as a threshold for the deterioration determination is constant. Accordingly, when the catalyst performance is deteriorated by a sulfur component contained in the fuel, or when an engine operating condition changes, there is a high possibility of improper determination. That is, when the amount of the sulfur component accumulated in the catalyst becomes larger, or when the flow rate of exhaust gases from the engine is small, an output change speed of the downstream oxygen concentration sensor after changing the air-fuel ratio tends to become slow (the output change time period tends to become long), even if the downstream oxygen concentration sensor is normal. Thus, the downstream oxygen concentration sensor may be improperly determined to be deteriorated, when it is actually normal.

SUMMARY OF THE INVENTION

It is accordingly an object of the present invention to provide a deterioration detecting device which can more accurately determine deterioration of an oxygen concentration sensor disposed downstream of a catalyst for purifying exhaust gases.

The present invention provides a deterioration detecting device for detecting deterioration of a downstream oxygen concentration sensor (15) disposed downstream of a catalyst (16) which is provided in an exhaust passage (12) of an internal combustion engine (1) to purify exhaust gases. The catalyst (16) has a capability of storing oxygen. The deterioration detecting device includes execution condition determining means, rich air-fuel ratio setting means, air-fuel ratio changing means, dead time period measuring means, determination threshold setting means, change time period measuring means, and deterioration determining means. The execution condition determining means determines an execution condition for deterioration determination of the downstream oxygen concentration sensor (15). The rich air-fuel ratio setting means sets an air-fuel ratio of an air-fuel mixture to be supplied to the engine to a predetermined rich air-fuel ratio (KOSO2H) in a rich region with respect to a stoichiometric ratio when the execution condition is satisfied. The air-fuel ratio changing means changes the air-fuel ratio to a predetermined lean air-fuel ratio in a lean region with respect to the stoichiometric ratio when a predetermined enrichment time period (TRICH) has elapsed from the time (t0) of enrichment of the air-fuel ratio by the rich air-fuel ratio setting means. The dead time period measuring means measures a dead time period (TNR) from the time (t1) the air-fuel ratio has been changed by the air-fuel ratio changing means to the time (t2) an output (SVO2) from the downstream oxygen concentration sensor (15) reaches a first predetermined value (SVO2W). The determination threshold setting means sets a determination threshold according to the dead time period (TNR). The change time period measuring means measures a change time period (TFS) from the time (t2) the output (SVO2) from the downstream oxygen concentration sensor has reached the first predetermined value (SVO2W) to the time (t3) the output (SVO2) from the downstream oxygen concentration sensor reaches a second predetermined value (SVO2STP) indicative of an oxygen concentration higher than an oxygen concentration corresponding to the first predetermined value (SVO2W). The deterioration determining means determines that the downstream oxygen concentration sensor (15) is deteriorated when the change time period (TFS) is greater than the determination threshold.

With this configuration, the air-fuel ratio is changed from the rich air-fuel ratio to the lean air-fuel ratio, and the dead time period from the time of changing the air-fuel ratio to the time the output from the downstream oxygen concentration sensor reaches the first predetermined value, is measured. Subsequently, the change time period from the time the output from the downstream oxygen concentration sensor has reached the first predetermined value to the time the output from the downstream oxygen concentration sensor reaches the second predetermined value indicative of an oxygen concentration higher than that corresponding to the first predetermined value. When this change time period is greater than the determination threshold set according to the dead time period, it is determined that the downstream oxygen concentration sensor is deteriorated. The dead time period (TNR) and the change time (TFS) tend to be short when the degree of deterioration of the catalyst becomes great, and tend to be long when the flow rate of exhaust gases is small. Accordingly, by setting the determination threshold according to the dead time period, accurate determination can be performed.

Preferably, the determination threshold setting means sets an upper determination threshold (TSVOH) and a lower determination threshold (TSVOL) which is less than the upper determination threshold (TSVOH), according to the dead time period (TNR), and the deterioration determining means determines that the downstream oxygen concentration sensor (15) is deteriorated when the change time period (TFS) is greater than the upper determination threshold (TSVOH), determines that the downstream oxygen concentration sensor (15) is normal when the change time period (TFS) is less than the lower determination threshold (TSVOL), and withholds the determination when the change time period (TFS) is in a range between the lower determination threshold (TSVOL) and the upper determination threshold (TSVOH).

With this configuration, the upper determination threshold and the lower determination threshold less than the upper determination threshold are set according to the dead time period. When the change time period is greater than the upper determination threshold, it is determined that the downstream oxygen concentration sensor is deteriorated. When the change time period is less than the lower determination threshold, it is determined that the downstream oxygen concentration sensor is normal. When the change time period is in the range between the lower determination threshold and the upper determination threshold, the determination is withheld. That is, when accurate determination is difficult to perform, the determination is withheld, thereby making it possible to prevent improper determination.

Preferably, the deterioration determination by the rich air-fuel ratio setting means, the air-fuel ratio changing means, the dead time period measuring means, the determination threshold setting means, and the deterioration determining means is executed again, when the determination is withheld and the execution condition is thereafter satisfied.

With this configuration, when the determination is withheld, the deterioration determination is performed again. Even when the determination is withheld, the deterioration or normality may be determined upon a change in the engine operating condition. Accordingly, by performing the deterioration determination again, the time period of withholding the determination can be reduced to thereby promptly obtain an accurate determination result.

Preferably, the deterioration detecting device further includes an upstream oxygen concentration sensor (14) disposed upstream of the catalyst (16), and the dead time period measuring means starts measuring the dead time period (TNR) at the time (t1a) the output (PVO2) from the upstream oxygen concentration sensor (14) has changed to a value indicative of a lean air-fuel ratio with respect to the stoichiometric ratio after the air-fuel ratio is changed by the air-fuel ratio changing means.

BRIEF DESCRIPTION OF THE DRAWINGS

FIG. 14 is a time chart for illustrating a second embodiment.

DETAILED DESCRIPTION OF THE PREFERRED EMBODIMENTS

Some preferred embodiments of the present invention will now be described with reference to the drawings.

Figure 1:
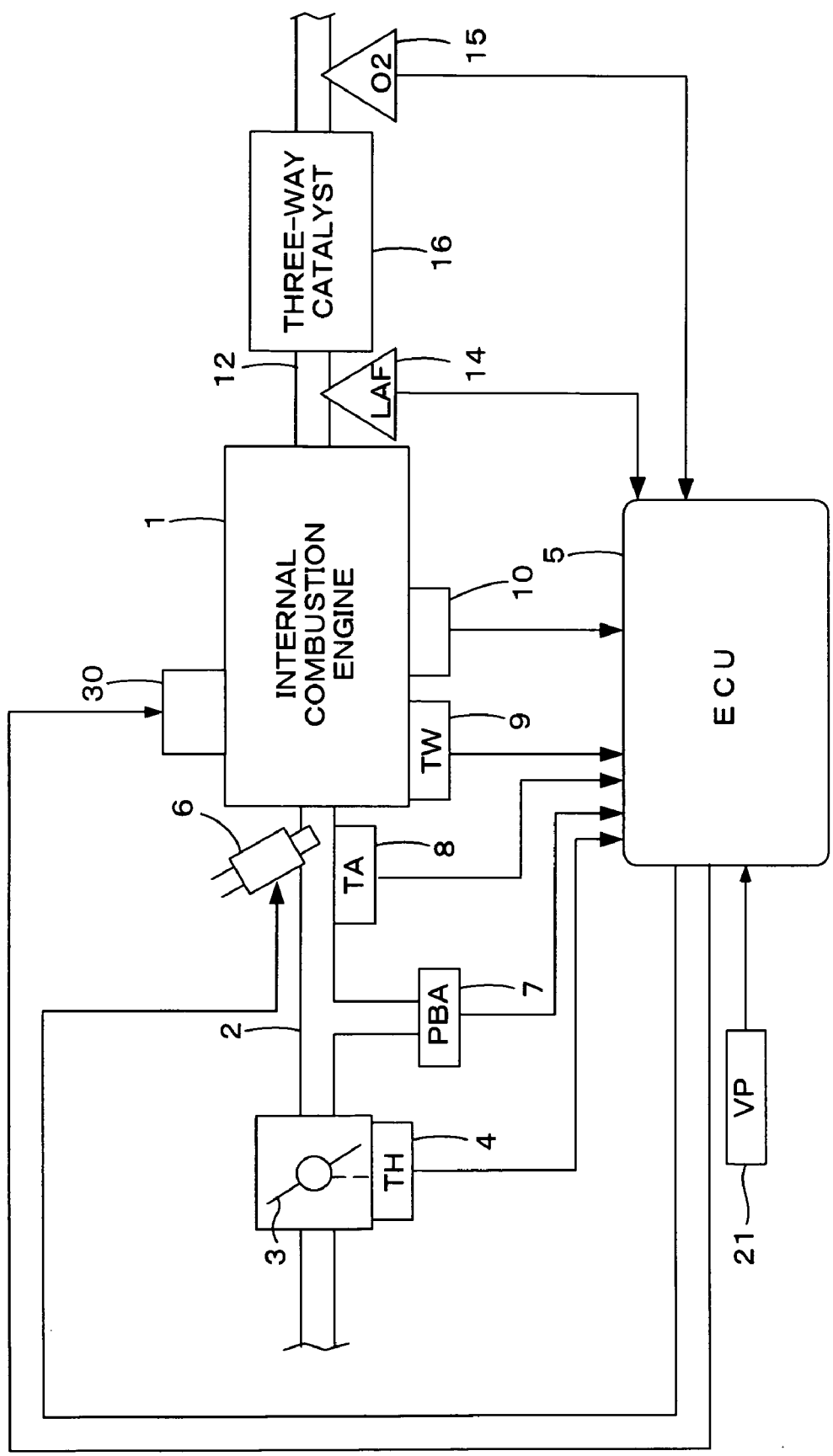
FIG. 1 is a schematic diagram of an internal combustion engine and a control system according to a preferred embodiment of the present invention.

FIG. 1 is a schematic diagram showing a configuration of an internal combustion engine (which will be hereinafter referred to as an "engine") and a control system therefore according to a preferred embodiment of the present invention. The engine 1 is, for example, a four-cylinder engine having an intake pipe 2 provided with a throttle valve 3. A throttle valve angle (TH) sensor 4 is connected to the throttle valve 3, so as to output an electrical signal corresponding to an opening TH of the throttle valve 3 and supply the electrical signal to an electronic control unit (which will be hereinafter referred to as "ECU") 5.

A fuel injection valve 6 is provided for each cylinder so as to inject fuel into the intake pipe 2. That is, four fuel injection valves 6 are respectively provided for the four cylinders of the engine 1. These fuel injection valves 6 are connected to a fuel pump (not shown), and electrically connected to the ECU 5. A valve opening period of each fuel injection valve 6 is controlled by a signal output from the ECU 5.

An absolute intake pressure (PBA) sensor 7 for detecting an absolute intake pressure of the engine 1 is provided immediately downstream of the throttle valve 3. An absolute pressure signal converted to an electrical signal by the absolute intake pressure sensor 7 is supplied to the ECU 5. An intake air temperature (TA) sensor 8 is provided downstream of the absolute intake pressure sensor 7 to detect an intake air temperature TA. An electrical signal corresponding to the detected intake air temperature TA is output from the sensor 8 and supplied to the ECU 5.

An engine coolant temperature (TW) sensor 9 such as a thermistor is mounted on the body of the engine 1 to detect an engine coolant temperature (cooling water temperature) TW. A temperature signal corresponding to the detected engine coolant temperature TW is output from the sensor 9 and supplied to the ECU 5.

A crank angle position sensor 10 for detecting a rotational angle of a crankshaft (not shown) of the engine 1 is connected to the ECU 5, and a signal corresponding to the rotational angle of the crankshaft is supplied to the ECU 5. The crank angle position sensor 10 consists of a cylinder discrimination sensor for outputting a pulse (which will be hereinafter referred to as "CYL pulse") at a predetermined crank angle position of a specific cylinder of the engine 1, a TDC sensor for outputting a TDC pulse at a crank angle position before a top dead center (TDC) by a predetermined crank angle at starting an intake stroke of each cylinder (at every 180 deg crank angle in the case of a four-cylinder engine), and a CRK sensor for generating a pulse (which will be hereinafter referred to as "CRK pulse") at every given crank angle (e.g., 30 deg) less than that of the TDC pulse. All of the CYL pulse, the TDC pulse, and the CRK pulse are supplied to the ECU 5. These pulses are used for control of various timings such as fuel injection timing and ignition timing and for detection of an engine rotational speed (engine rotational speed) NE.

An exhaust pipe 12 of the engine 1 is provided with a three-way catalyst 16. The three-way catalyst 16 has a capability of storing oxygen contained in exhaust gases, and reduces amounts of components such as HC, CO, and NOx contained in the exhaust gases. A proportional type air-fuel ratio sensor (which will be hereinafter referred to as "LAF sensor") 14 is mounted on the exhaust pipe 12 at a position upstream of the three-way catalyst 16. The LAF sensor 14 outputs a detection signal substantially proportional to an oxygen concentration (air-fuel ratio) in the exhaust gases, and supplies the detection signal to the ECU 5. Further, an oxygen concentration sensor (which will be hereinafter referred to as "O2 sensor") 15 for detecting an oxygen concentration in the exhaust gases is mounted on the exhaust pipe 12 at a position downstream of the three-way catalyst 16. The O2 sensor 15 has a characteristic such that its output rapidly changes in the vicinity of the stoichiometric ratio. More specifically, the output from the O2 sensor 15 indicates a high level in a rich region with respect to the stoichiometric ratio and a low level in a lean region with respect to the stoichiometric ratio. The O2 sensor 15 is also connected to the ECU 5 to supply a detection signal to the ECU 5.

The engine 1 has a valve timing switching mechanism 30 capable of switching a valve timing of intake valves and exhaust valves between a high-speed valve timing suitable for a high-speed rotational region of the engine 1 and a low-speed valve timing suitable for a low-speed rotational region of the engine 1. This switching of the valve timing also includes switching of a valve lift amount. Further, when selecting the low-speed valve timing, one of the two intake valves in each cylinder is stopped to ensure stable combustion even when making the air-fuel ratio lean with respect to the stoichiometric ratio.

The valve timing switching mechanism 30 is of a type that the switching of the valve timing is carried out hydraulically. That is, although not shown, a solenoid valve for performing the hydraulic switching and an oil pressure sensor are connected to the ECU 5. A detection signal from the oil pressure sensor is supplied to the ECU 5, and the ECU 5 controls the solenoid valve to perform switching control of the valve timing according to an operating condition of the engine 1.

Although not shown, an evaporative fuel processing device having a canister is provided. The canister temporarily stores evaporative fuel generated in the fuel tank. The canister is connected through a purge passage to the intake pipe 2, so as to supply the evaporative fuel stored in the canister to the intake pipe 2 at an appropriate time.

A vehicle speed sensor 21 for detecting a running speed (vehicle speed) VP of a vehicle driven by the engine 1 is also connected to the ECU 5 to supply a speed signal to the ECU 5.

The ECU 5 includes an input circuit, a central processing unit (which will be hereinafter referred to as "CPU"), a memory circuit, and an output circuit. The input circuit has various functions including a function of shaping the waveforms of input signals from the various sensors, a function of correcting the voltage levels of the input signals to a predetermined level, and a function of converting analog signal values into digital signal values. The memory circuit preliminarily stores various operational programs to be executed by the CPU and stores results of computation or the like by the CPU. The output circuit supplies drive signals to the fuel injection valves 6 and spark plugs (not shown), for example.

The CPU in the ECU 5 determines various engine operating conditions according to various detection signals from the sensors as mentioned above, and calculates a fuel injection period TOUT of each fuel injection valve 6 in accordance with Eq. (1) according to the determined engine operating conditions. Each fuel injection valve 6 is opened (fuel is injected) in synchronism with the TDC pulse.

$$TOUT = TI \times KCMD \times KLAF \times K1 + K2 \quad (1)$$

TI is a basic fuel injection period of each fuel injection valve 6. The basic fuel injection period TI is determined by retrieving a TI map set according to the engine rotational speed NE and the absolute intake pressure PBA. The TI map is set so that the air-fuel ratio of an air-fuel mixture to be supplied to the engine 1 becomes substantially equal to the stoichiometric ratio in an operating condition corresponding to the engine rotational speed NE and the absolute intake pressure PBA on the map.

KCMD is a target air-fuel ratio coefficient, which is set according to engine operating parameters such as the engine rotational speed NE, the absolute intake pressure PBA, and the engine coolant temperature TW, and a detection signal from the O2 sensor 15. The target air-fuel ratio coefficient KCMD is proportional to the reciprocal of an air-fuel ratio A/F, i.e., proportional to a fuel-air ratio F/A, and takes a value of 1.0 for the stoichiometric ratio. Therefore, KCMD is referred to also as a target equivalent ratio.

KLAF is an air-fuel ratio correction coefficient calculated so that a detected equivalent ratio KACT calculated from a detected air-fuel ratio from the LAF sensor 14 coincides with the target equivalent ratio KCMD. When the feedback control according to the detected air-fuel ratio from the LAF sensor 14 is not performed, KLAF is set to a noncorrective value (1.0) or a learning value.

K1 is another correction coefficient and K2 is a correction variable. The correction coefficient K1 and the correction variable K2 are respectively calculated according to various engine operating parameters. These correction coefficient K1 and correction variable K2 are set to such values as to optimize various characteristics such as fuel consumption characteristics and engine acceleration characteristics according to the engine operating conditions.

The CPU in the ECU 5 performs deterioration determination of the O2 sensor 15 as described below. An outline of the deterioration determination method in this embodiment will now be described with reference to FIG. 2.

When a deterioration determination execution condition is satisfied at time t0, an execution condition flag FMCND is set to "1" and the deterioration determination is started. Initially, the target equivalent ratio KCMD is set to a rich predetermined value KOSO2H (e.g., 1.05) greater than "1.0" over a rich set time period TRICH. An output from the O2 sensor 15 (which output will be hereinafter referred to as "O2 sensor output") SVO2 starts rising after a time lag from the air-fuel ratio enriching time (t0) because the O2 sensor 15 is located downstream of the three-way catalyst 16.

At time t1, after the elapse of the rich set time period TRICH, the target equivalent ratio KCMD is changed to a lean predetermined value KOSO2L (e.g., 0.98). The time period from time t1 to time t2 when the O2 sensor output SVO2 reaches a first predetermined voltage SVO2W (e.g., 0.4 V) is measured as a dead time period TNR.

The time period from time t2 to time t3 when the O2 sensor output SVO2 reaches a second predetermined voltage SVO2STP (e.g., 0.15 V) is measured as a change time period TFS. An upper determination threshold TSVOH and a lower determination threshold TSVOL are set according to the dead time period TNR. If the change time period TFS is greater than the upper determination threshold TSVOH, it is determined that the O2 sensor 15 is deteriorated. If the change time period TFS is less than the lower determination threshold TSVOL, it is determined that the O2 sensor 15 is normal. If the change time period TFS is in the range between the lower determination threshold TSVOL and the upper determination threshold TSVOH, the determination is withheld. When the determination is withheld, a similar deterioration determination process is executed again when the deterioration determination execution condition is next satisfied.

Figure 3A:
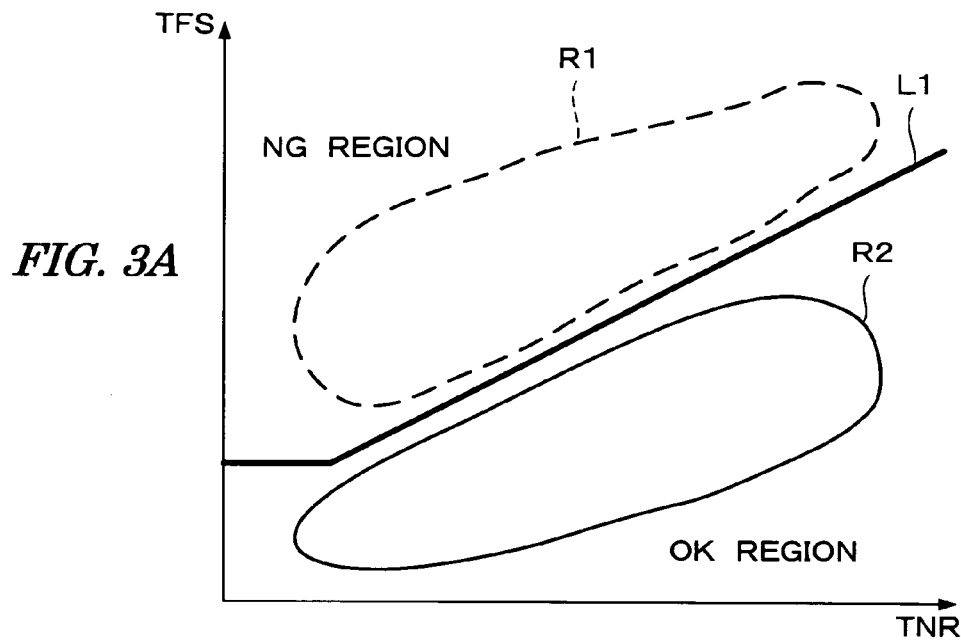
FIGS. 3A and 3B are graphs showing a correlation between the dead time period (TNR) and the change time period (TFS)
Figure 3B:
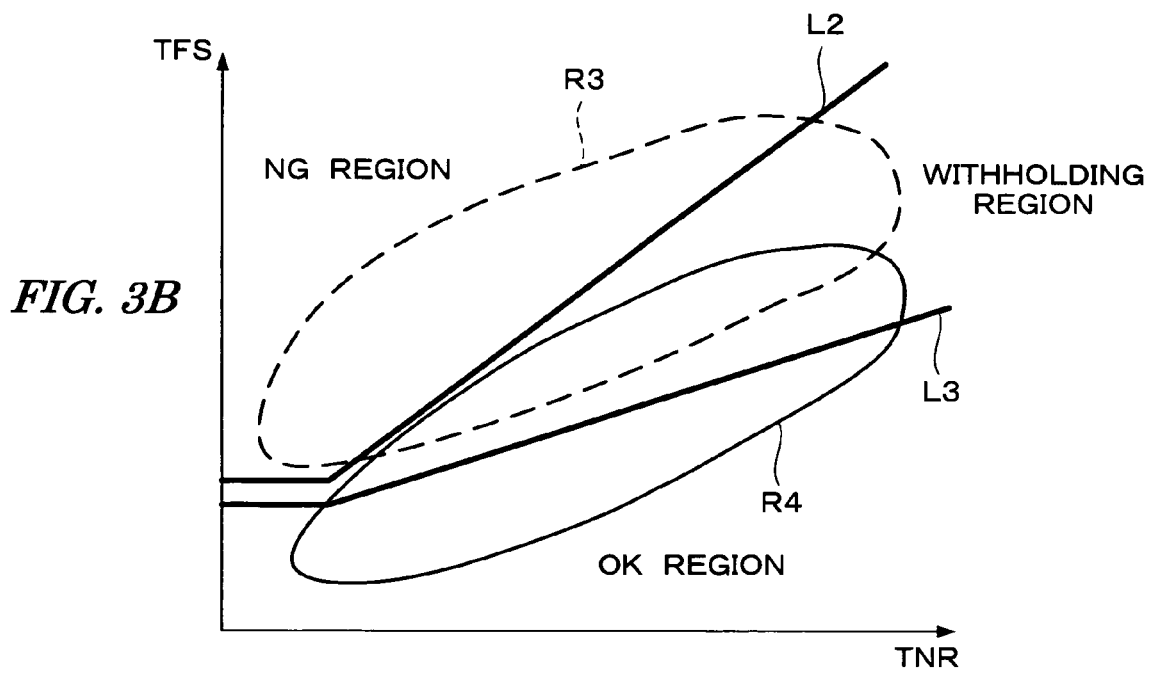

FIGS. 3A and 3B are graphs showing a relationship between the dead time period TNR and the change time period TFS. FIG. 3A corresponds to the case where a fuel having little sulfur component is used, and FIG. 3B corresponds to the case where a fuel having much sulfur component is used. In FIGS. 3A and 3B, regions R1 and R3 surrounded by the broken lines show ranges of distribution of measured data in the deteriorated condition of the O2 sensor 15, while regions R2 and R4 surrounded by the solid lines show ranges of distribution of measured data in the normal condition of the O2 sensor 15.

As shown in FIGS. 3A and 3B, there is a correlation between the dead time period TNR and the change time period TFS in such a manner that the change time period TFS increases with an increase in the dead time period TNR. The dead time period TNR and the change time period TFS change according to the degree of deterioration of the three-way catalyst 16 and the flow rate of exhaust gases. Accordingly, by setting the determination threshold according to the dead time period TNR, accurate deterioration determination can be made irrespective of the degree of deterioration of the three-way catalyst 16 and the flow rate of exhaust gases.

In the case of FIG. 3A, the regions R1 and R2 do not overlap each other. Accordingly, by setting the determination threshold corresponding to a line L1 according to the dead time period TNR, a deteriorated condition of the O2 sensor 15 can be accurately determined. However, in FIG. 3B, the regions R3 and R4 overlap each other, so that there is an area where it is not possible to determine whether the O2 sensor 15 is normal or deteriorated.

According to this embodiment, the upper determination threshold TSVOH corresponding to the line L2 and the lower determination threshold TSVOL corresponding to the line L3 are set according to the dead time period TNR. If the change time period TFS is in the range between the lower determination threshold TSVOL and the upper determination threshold TSVOH, the determination is withheld. Accordingly, improper determination may be prevented.

Even when the determination has been withheld, it may sometimes become possible to decide whether the O2 sensor 15 is normal or deteriorated, if the operating condition of the engine 1 has changed. Therefore, when the determination has been withheld, the deterioration determination process is executed again, thereby making it possible to promptly obtain an accurate determination result.

Figure 4:
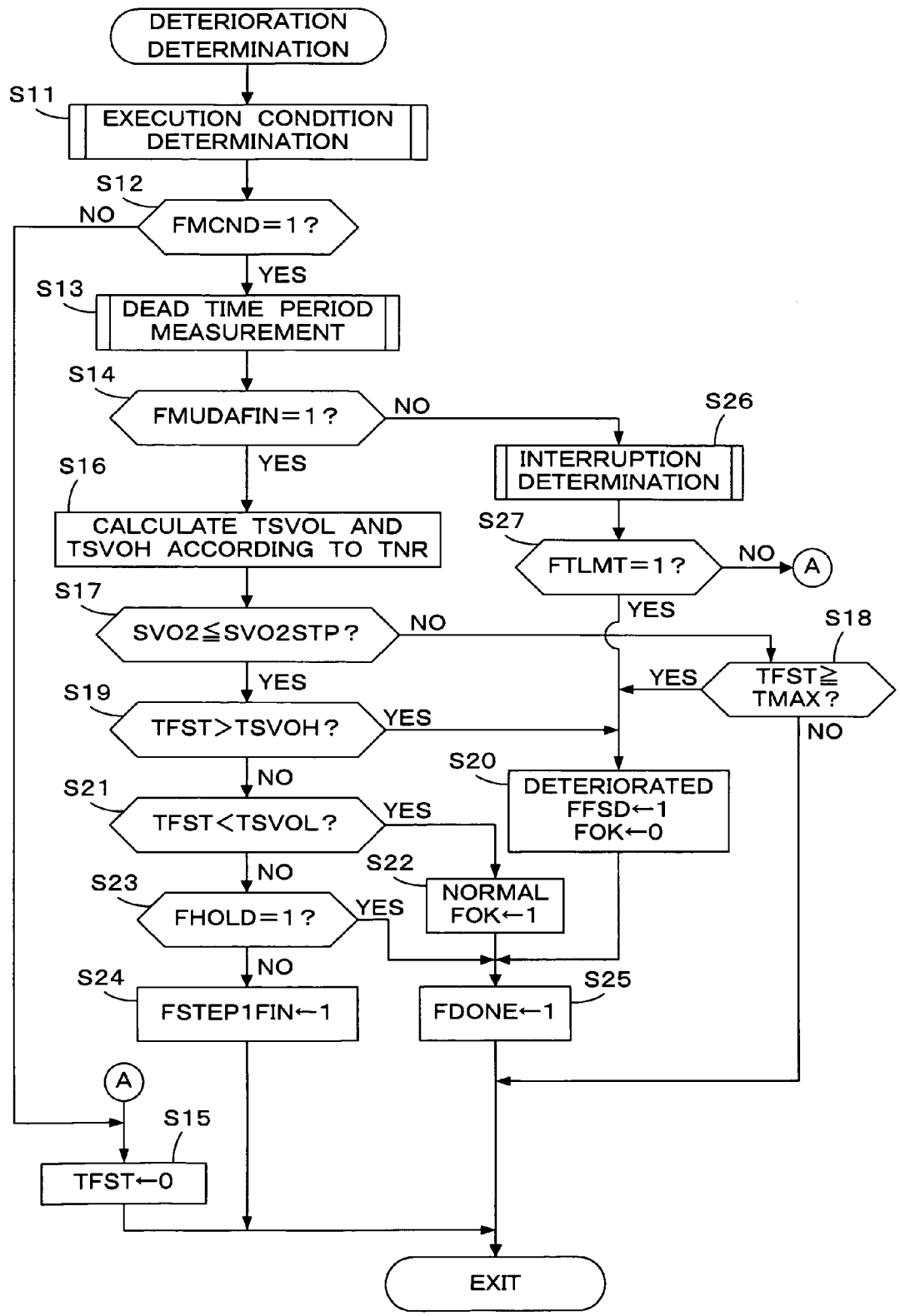
FIG. 4 is a flowchart showing a process for determining deterioration of an oxygen concentration sensor.

FIG. 4 is a flowchart showing a process for performing the deterioration determination of the O2 sensor 15. This process is executed by the CPU of the ECU 5 at predetermined time intervals (e.g., 10 msec).

Figure 6:
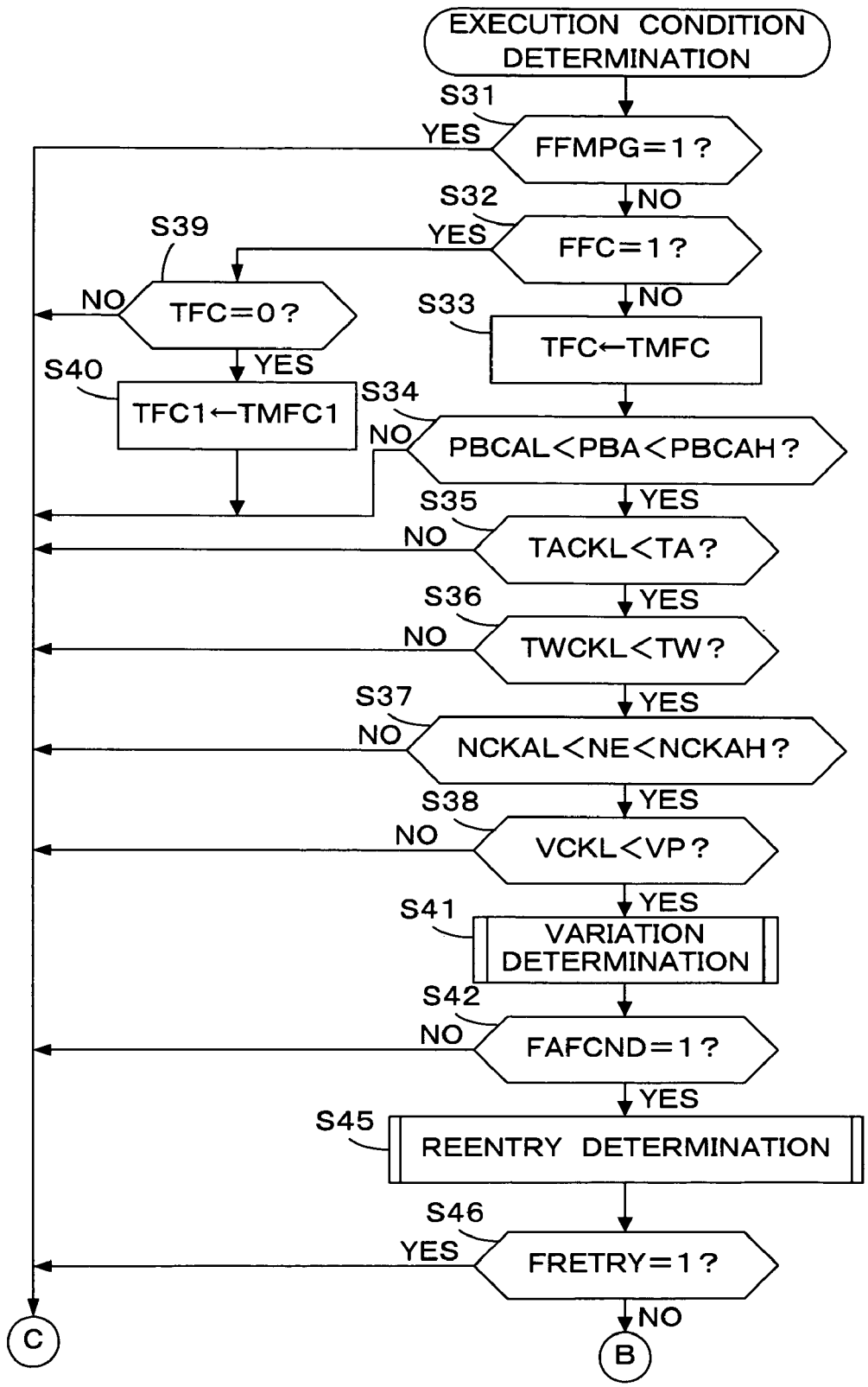
FIGS. 6 and 7 are flowcharts showing an execution condition determination process executed in the process of FIG. 4.
Figure 7:
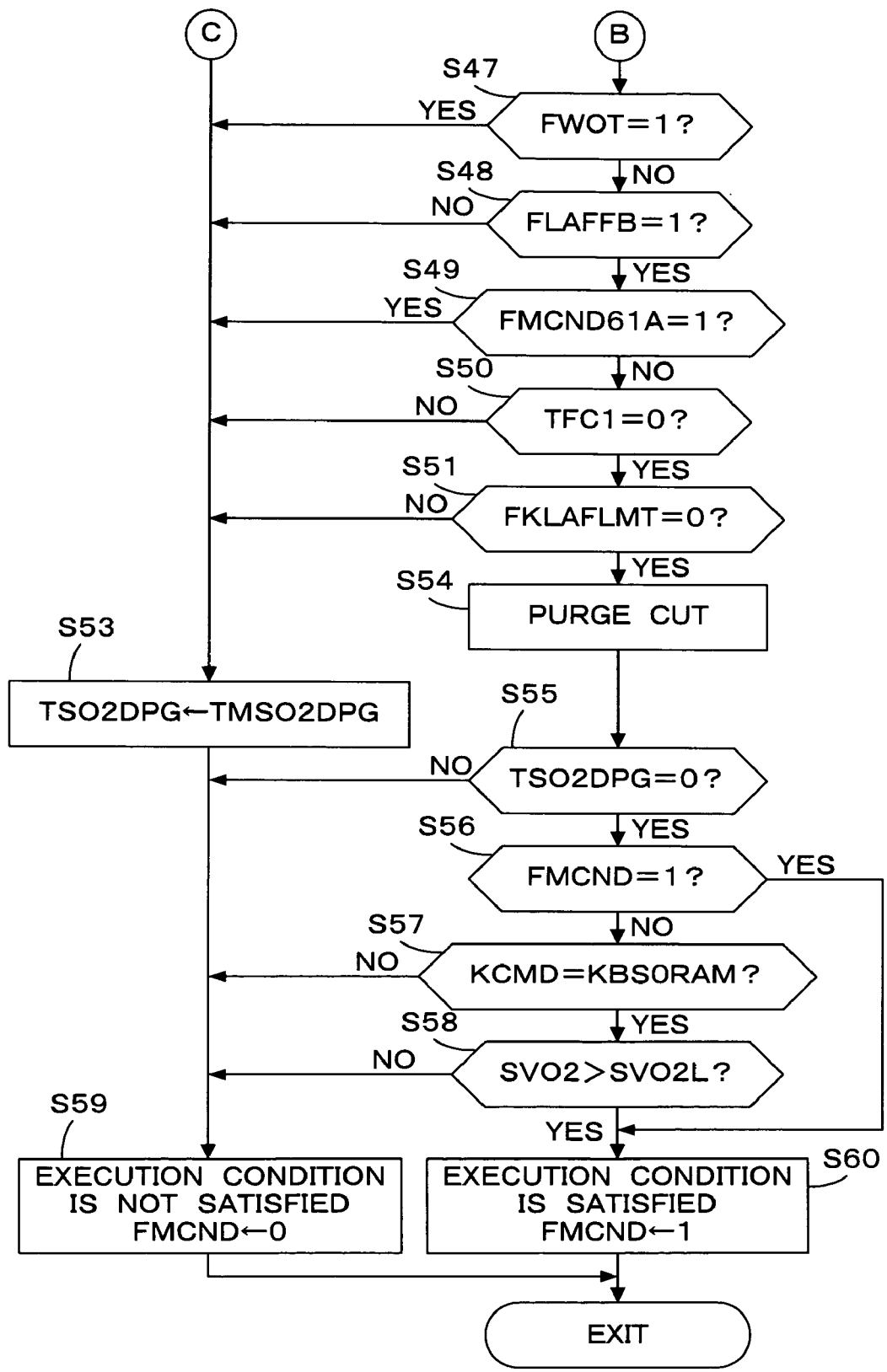

In step S11, an execution condition determination process shown in FIGS. 6 and 7 is executed to determine whether or not the execution condition of deterioration determination is satisfied. If the execution condition is satisfied, the execution condition flag FMCND is set to "1" in the process of step S11. In step S12, it is determined whether or not the execution condition flag FMCND is "1". If the answer to step S12 is negative (NO), a value of an upcount timer TFST is reset to "0" (step S15), and this process ends.

Figure 11:
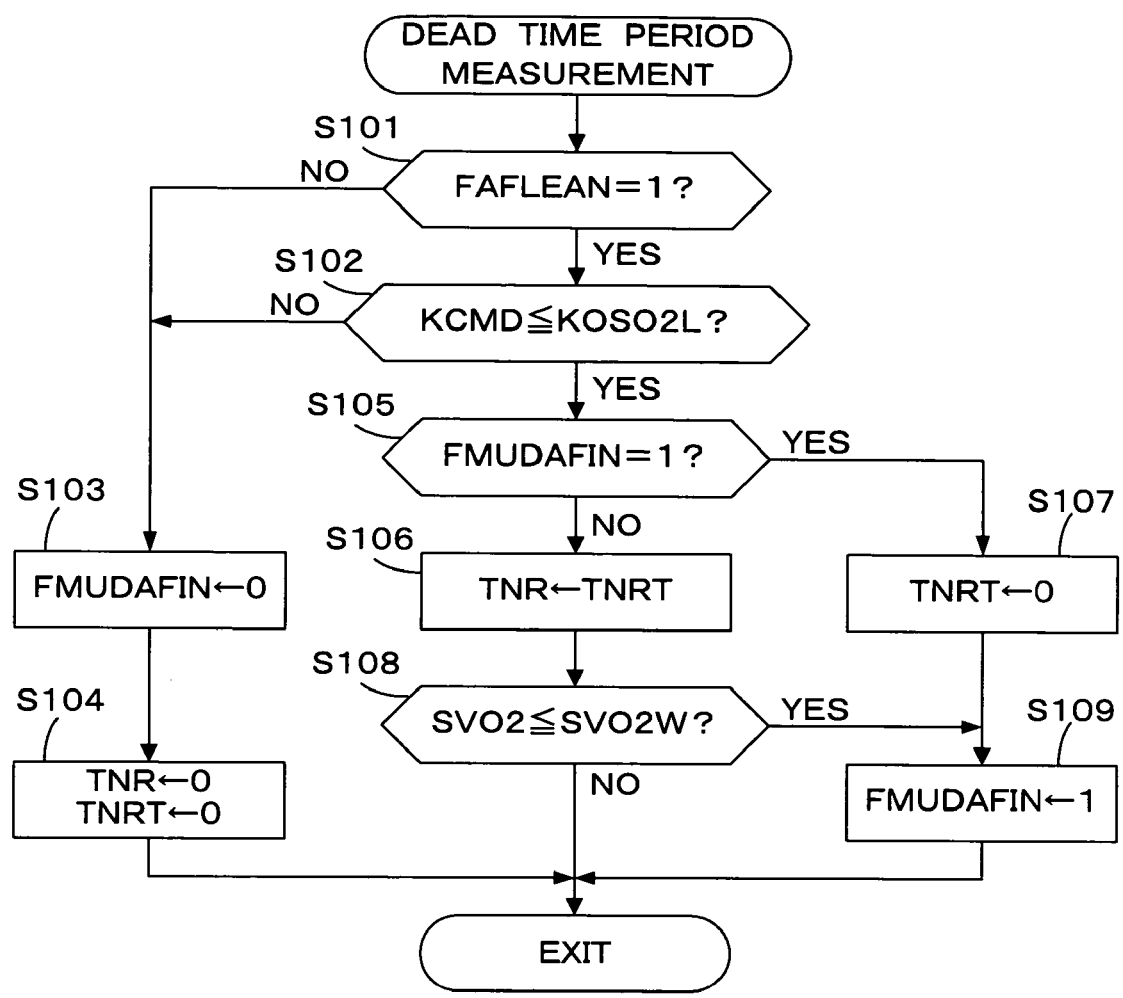
FIG. 11 is a flowchart showing a dead time period measurement process executed in the process of FIG. 4.

If the answer to step S12 is affirmative (YES), that is, if the execution condition is satisfied, a dead time period measurement process shown in FIG. 11 is executed to measure the dead time period TNR (step S13). When the dead time period measurement is completed, a TNR measurement end flag FMUDAFIN is set to "1" in the process of FIG. 11.

Figure 9:
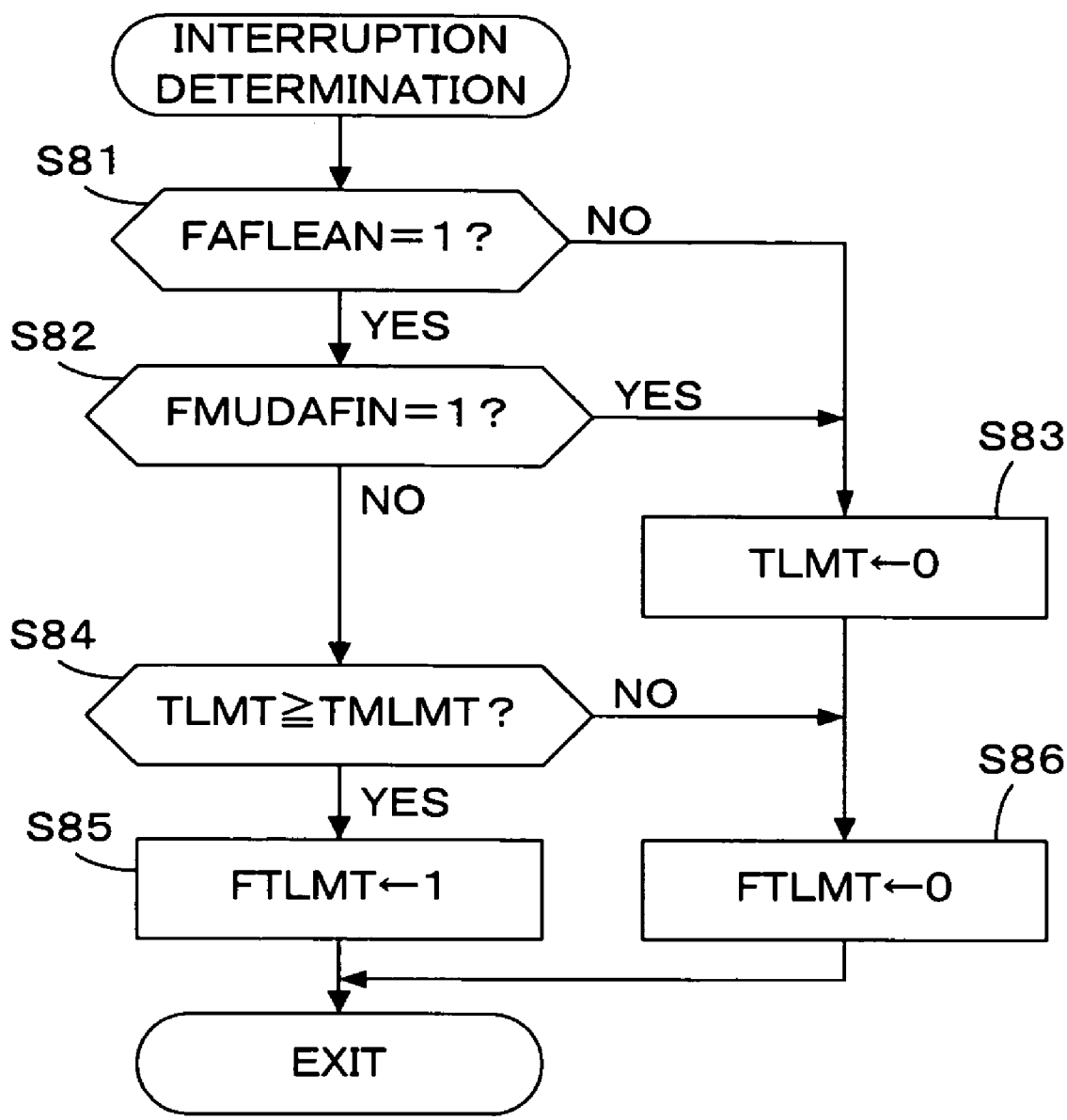
FIG. 9 is a flowchart showing an interruption determination process executed in the process of FIG. 4.

In step S14, it is determined whether or not the TNR measurement end flag FMUDAFIN is "1". If the answer to step S14 is negative (NO), the interruption determination process shown in FIG. 9 is executed (step S26). In the interruption determination process, an interruption flag FTLMT is set to "1" when the measured time period of the dead time period TNR reaches a predetermined upper limit TMLMT (e.g., 15 sec). In step S27, it is determined whether or not the interruption flag FTLMT is "1". If the answer to step S27 is affirmative (YES), this indicates that the O2 sensor output SVO2 does not decrease or its decreasing speed is very low. Accordingly, it is determined that the O2 sensor 15 is deteriorated, and the process proceeds to step S20, in which a deterioration flag FFSD is set to "1" and a normality flag FOK is set to "0". Subsequently, a determination end flag FDONE is set to "1" (step S25). Thereafter the process ends. If FTLMT is not equal to "1" (or equal to "0" in some embodiments) in step S27, the process proceeds to step S15 where timer TFST is reset to "0".

Figure 5:
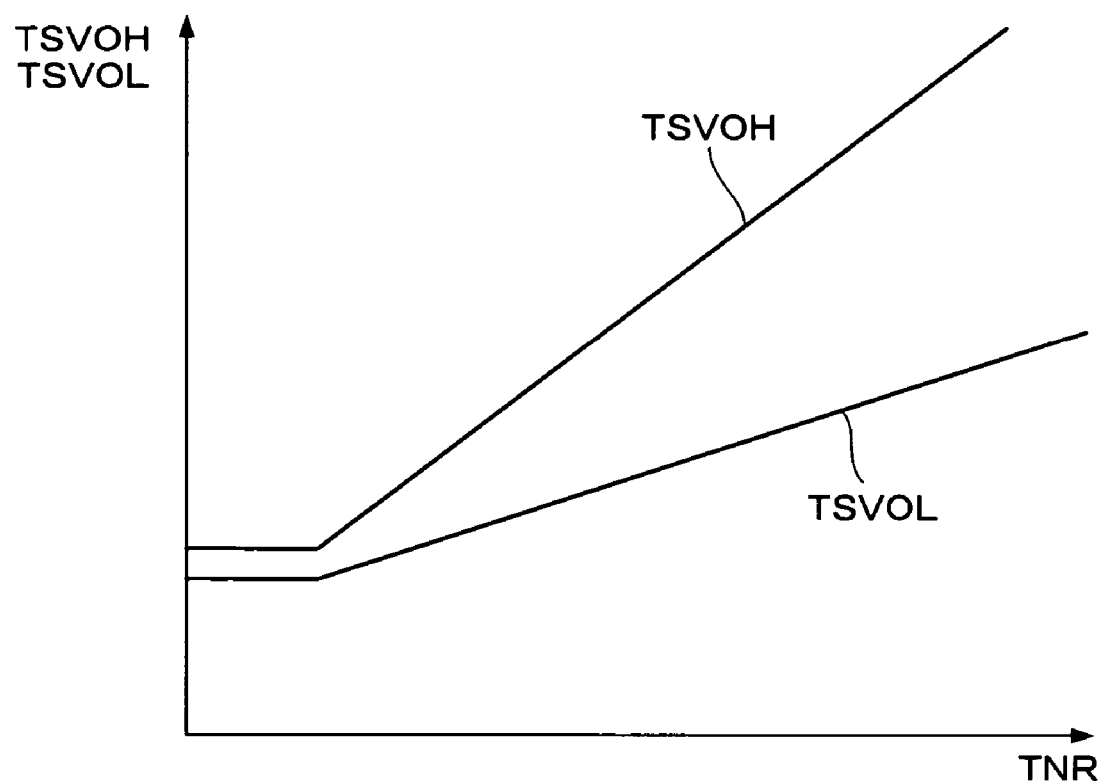
FIG. 5 is a graph showing a table used in the process of FIG. 4.

When the TNR measurement end flag FMUDAFIN becomes "1", the process proceeds to step S16, in which a TSVOL table and a TSVOH table, examples of which are shown in FIG. 5, are retrieved according to the dead time period TNR to calculate the lower determination threshold TSVOL and the upper determination threshold TSVOH. The TSVOL table and the TSVOH table correspond respectively to the lines L3 and L2 shown in FIG. 3B.

In step S17, it is determined whether or not the O2 sensor output SVO2 is less than or equal to the second predetermined voltage SVO2STP. If SVO2 is greater than SVO2STP, it is determined whether or not the value of the timer TFST is greater than or equal to a maximum change time period TMAX (e.g., 25 sec) (step S18). If the answer to step S18 is negative (NO), this process ends. If the value of the timer TFST has reached the maximum change time period TMAX, this indicates that the O2 sensor output SVO2 does not decrease to a voltage indicative of a lean air-fuel ratio although the air-fuel ratio has been changed to the lean air-fuel ratio. Accordingly, it is determined that the O2 sensor 15 is deteriorated, and the process proceeds to step S20.

If the O2 sensor output SVO2 has reached the second predetermined voltage SVO2STP in step S17, the process proceeds to step S19, in which it is determined whether or not the value of the timer TFST, that is, the change time period TFS is greater than the upper determination threshold TSVOH. If TFST is greater than TSVOH in step S19, it is determined that the O2 sensor 15 is deteriorated, and the process proceeds to step S20.

If the answer to step S19 is negative (NO), it is determined whether or not the value of the timer TFST (the change time period TFS) is less than the lower determination threshold TSVOL (step S21). If TFST is less than TSVOL in step S21, it is determined that the O2 sensor 15 is normal, and the normality flag FOK is set to "1" (step S22).

If the answer to step S21 is negative (NO), that is, if the change time period TFS is in the range between the lower determination threshold TSVOL and the upper determination threshold TSVOH, it is determined whether or not a hold flag FHOLD is "1". Initially, FHOLD is equal to "0", so that the process proceeds to step S24, in which a first step end flag FSTEP1FIN is set to "1". When the first step end flag FSTEP1FIN is set to "1", this indicates that the determination is withheld, and it is required to reenter the deterioration determination process. The hold flag FHOLD is set in the process shown in FIG. 10. Specifically, the hold flag FHOLD is set to "1" when the first step end flag FSTEP1 FIN is set to "1".

When the deterioration determination process is reentered, and the process reaches step S23 again, the process next proceeds to step S25 because the hold flag FHOLD would have been set to "1". In step S25, the determination end flag FDONE is set to "1". When the determination end flag FDONE is set to "1", the deterioration determination is not performed until the engine 1 is stopped and next restarted.

FIGS. 6 and 7 are flowcharts showing the execution condition determination process executed in step S11 of FIG. 4.

In step S31, it is determined whether or not a purge cut flag FFMPG is "1". The purge cut flag FFMPG is set to "1" when the supply of evaporative fuel from the evaporative fuel processing device to the intake pipe 2 is stopped (purge cut) during execution of the failure diagnosis of the fuel supply system. If FFMPG is equal to "1", a downcount timer TSO2DPG is set to a predetermined time TMSO2DPG (e.g., 2.5 sec) and then started (step S53). The downcount timer TSO2DPG is referred to in step S55 described below. In step S59, it is determined that the execution condition is not satisfied, and the execution condition flag FMCND is set to "0".

If FFMPG is not equal to "1"(or in some embodiments equal to "0") in step S31, it is determined whether or not a fuel cut flag FFC is "1" (step S32). The fuel cut flag FFC is set to "1" when the fuel supply to the engine 1 is stopped (fuel cut is being performed). If FFC is not equal to "1" (or in some embodiments equal to "0"), which indicates that the fuel cut is not being performed, a downcount timer TFC is set to a predetermined time TMFC (e.g., 60 sec) and then started (step S33). If FFC is equal to "1", which indicates that the fuel cut is being performed, it is determined whether or not the value of the timer TFC started in step S33 has become "0" (step S39). If TFC is greater than "0" in step S39, the process proceeds to step S53. If TFC is equal to "0" in step S39, a downcount timer TFC1 is set to a predetermined time TMFC1 (e.g., 40 sec) and then started. The downcount timer TFC1 is referred to in step S50 described below.

In step S34, it is determined whether or not the absolute intake pressure PBA is in the range between a predetermined upper limit PBCAH (e.g., 64 kPa (480 mmHg)) and a predetermined lower limit PBCAL (e.g., 24 kPa (180 mmHg)). If the answer to step S34 is affirmative (YES), it is determined whether or not the intake air temperature TA is higher than a predetermined lower limit TACKL (e.g., −25° C.) (step S35). If the answer to step S35 is affirmative (YES), it is determined whether or not the engine coolant temperature TW is higher than a predetermined lower limit TWCKL (e.g., 70° C.) (step S36). If the answer to step S36 is affirmative (YES), it is determined whether or not the engine rotational speed NE is in the range between a predetermined upper limit NCKAH (e.g., 2250 rpm) and a predetermined lower limit NCKAL (e.g., 1050 rpm) (step S37). If the answer to step S37 is affirmative (YES), it is determined whether or not the vehicle speed VP is higher than a predetermined lower limit VCKL (e.g., 41 km/h) (step S38).

Figure 8:
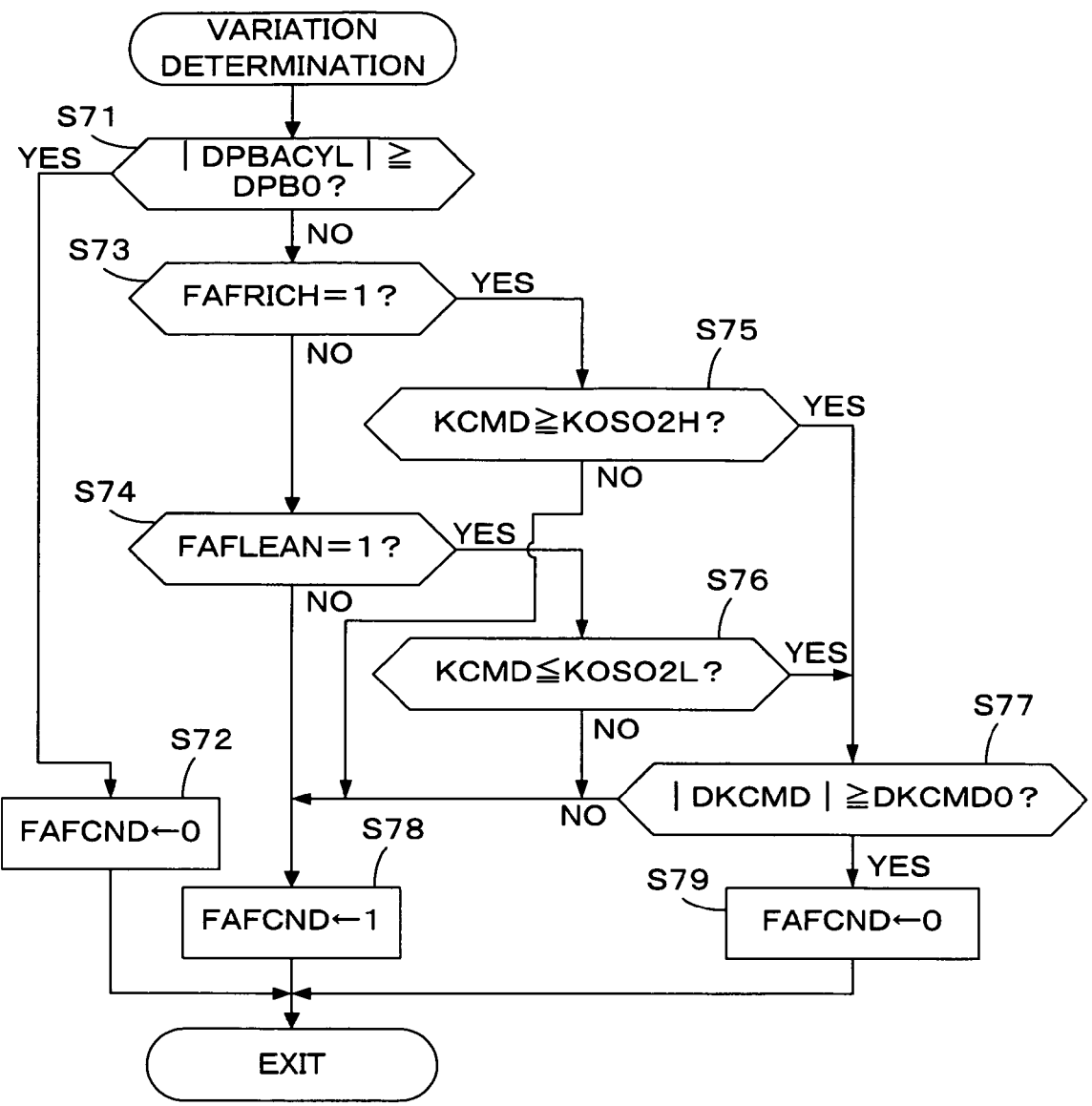
FIG. 8 is a flowchart showing a variation determination process executed in the process of FIGS. 6 and 7.

If the answer to any one of steps S34 to S38 is negative (NO), the process proceeds to step S53. If the answers to all of steps S34 to S38 are affirmative (YES), a variation determination process shown in FIG. 8 is executed (step S41). In the variation determination process, a variation flag FAFCND is set to "1" when variations in the absolute intake pressure PBA and variations in the target equivalent ratio KCMD are small.

Figure 10:
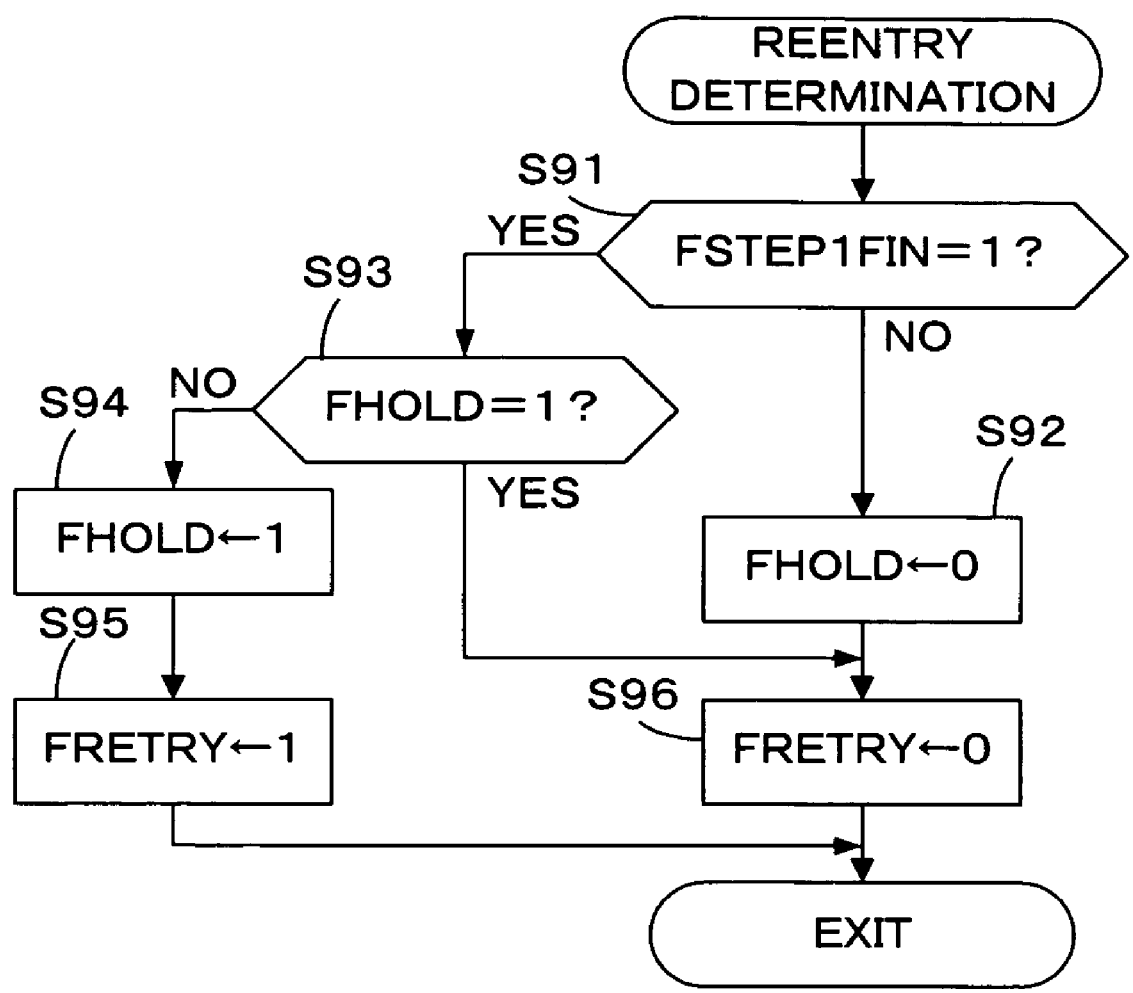
FIG. 10 is a flowchart showing a reentry determination process executed in the process of FIGS. 6 and 7.

In step S42, it is determined whether or not the variation flag FAFCND is "1". If the answer to step S42 is negative (NO), the process proceeds to step S53. When FAFCND is equal to "1", which indicates that variations in the absolute intake pressure PBA and variations in the target equivalent ratio KCMD are small, the reentry determination process shown in FIG. 10 is executed (step S45). In the reentry determination process, a reentry flag FRETRY is set to "1" if the first step end flag FSTEP1FIN is set to "1" and the flag FHOLD is set to "0". Accordingly, the execution condition flag FMCND is set to "0" at the next execution timing of the process shown in FIGS. 6 and 7, and the deterioration determination ends. In the next execution of the process of FIG. 6, the reentry flag FRETRY is immediately returned to "0" in the reentry determination process of FIG. 10 which is a subroutine included in the process of FIG. 6, so that the deterioration determination can be executed again.

In step S46, it is determined whether or not the reentry flag FRETRY is "1". If the answer to step S46 is affirmative (YES), the process proceeds to step S53. If FRETRY is not equal to "1" (or in some embodiments equal to "0") in step S46, the process proceeds to step S47, in which it is determined whether or not a high-load operation flag FWOT is "1". The high-load operation flag FWOT is set to "1" in a high-load operating condition where the throttle valve 3 is substantially fully open.

If FWOT is equal to "1", the process proceeds to step S53. If FWOT is not equal to "1" (or in some embodiments equal to "0"), it is determined whether or not a feedback control flag FLAFFB is "1" (step S48). The feedback control flag FLAFFB is set to "1" when the air-fuel ratio feedback control according to an output from the LAF sensor 14 is being performed.

If FLAFFB is not equal to "1" (or in some embodiments equal to "0"), the process proceeds to step S53, whereas if FLAFFB is equal to "1", it is determined whether or not a LAF failure diagnosis flag FMCND61A is "1" (step S49). The LAF failure diagnosis flag FMCND61A is set to "1" when a failure diagnosis of the LAF sensor 14 is being performed.

If FMCND61A is equal to "1", the process proceeds to step S53. If FMCND61A is not equal to "1" (or on some embodiments equal to "0"), it is determined whether or not the value of the downcount timer TFC1 started in step S40 has become "0" (step S50). If TFC1 is greater than "0", the process proceeds to step S53. If TFC1 is equal to "0", it is determined whether or not a limit flag FKLAFLMT is "0" (step S51). The limit flag FKLAFLMT is set to "1" when the air-fuel ratio correction coefficient KLAF remains at a limit value for a predetermined time period or more.

If FKLAFLMT is not equal to "0" (or in some embodiments equal to "1"), the process proceeds to step S53, whereas if FKLAFLMT is equal to "0", the supply of evaporative fuel from the evaporative fuel process device to the intake pipe 2 is stopped (purge cut) (step S54), and it is then determined whether or not the value of the downcount timer TSO2DPG started in step S53 has become "0" (step S55). If TSO2DPG is greater than 0, the process proceeds to step S59. If TSO2DPG is equal to "0", it is determined whether or not the execution condition flag FMCND has already been set to "1"(step S56). If FMCND is equal to "1", the process proceeds directly to step S60, while if FMCND is not equal to "1" (or in some embodiments equal to "0"), it is determined whether or not the target equivalent ratio KCMD has been set to a value KBSORAM (1.0) corresponding to the stoichiometric ratio (step S57). If the answer to step S57 is negative (NO), the process proceeds to step S59. If KCMD=KBS0RAM, it is determined whether or not the O2 sensor output SVO2 is higher than a predetermined starting voltage SVO2L (e.g., 0.5 V) (step S58). If the answer to step S58 is negative (NO), the process proceeds to step S59. If SVO2 is greater than SVO2L, it is determined that the execution condition is satisfied, and the execution condition flag FMCND is set to "1" (step S60).

FIG. 8 is a flowchart of the variation determination process executed in step S41 shown in FIG. 6.

In step S71, it is determined whether or not an absolute value of an intake pressure change amount DPBACYL is greater than or equal to a predetermined change amount DPB0 (e.g., 5.3 kPa (40 mmHg)). If the answer to step S71 is affirmative (YES), the variation flag FAFCND is set to "0" (step S72). The intake pressure change amount DPBACYL is calculated as a difference (PBA(n)−PBA(n-4)) between a present value PBA(n) for the absolute intake pressure PBA and a past value PBA(n-4) of one combustion cycle before (in the case of four-cylinder engine).

If |DPBACYL| is less than DPB0 in step S71, it is determined whether or not an AF rich flag FAFRICH is "1" (step S73). The AF rich flag FAFRICH is set to "1" when the air-fuel ratio is set to a rich air-fuel ratio after satisfaction of the execution condition. If the answer to step S73 is negative (NO), it is determined whether or not an AF lean flag FAFLEAN is "1" (step S74). If the answer to step S74 is negative (NO), the variation flag FAFCND is set to "1" (step S78).

If FAFRICH is equal to "1" in step S73, it is determined whether or not the target equivalent ratio KCMD is greater than or equal to the rich predetermined value KOSO2H (step S75). If the answer to step S75 is negative (NO), the process proceeds to step S78. If the target equivalent ratio KCMD has reached the rich predetermined value KOSO2H, the process proceeds to step S77, in which it is determined whether or not the absolute value of a change amount DKCMD of the target equivalent ratio KCMD is greater than or equal to a predetermined change amount DKCMD0 (e.g., 0.016). The change amount DKCMD is calculated as a difference (KCMD(n)−KCMD(n-1)) between a preceding value KCMD(n-1) and a present value KCMD(n) of the target equivalent ratio KCMD.

If the answer to step S77 is negative (NO), the process proceeds to step S78. If |DKCMD| is greater than or equal to DKCMD0, the variation flag FAFCND is set to "0" (step S79).

If FAFLEAN is equal to "1" in step S74, it is determined whether or not the target equivalent ratio KCMD is less than or equal to the lean predetermined value KOSO2L (step S76). If the answer to step S76 is negative (NO), the process proceeds to step S78. If the target equivalent ratio KCMD has reached the lean predetermined value KOSO2L, the process proceeds to step S77.

According to the process of FIG. 8, the variation flag FAFCND is set to "1" when variations in the absolute intake pressure PBA are small and variations in the target equivalent ratio KCMD are also small.

FIG. 9 is a flowchart of the interruption determination process executed in step S26 shown in FIG. 4.

In step S81, it is determined whether or not the AF lean flag FAFLEAN is "1". If the answer to step S81 is negative (NO), a value of an upcount timer TLMT is reset to "0" (step S83), and the interruption flag FTLMT is set to "0" (step S86).

If FAFLEAN is equal to "1" in step S81, which indicates that the engine 1 is in a lean operating condition, it is determined whether or not the TNR measurement end flag FMUDAFIN is "1" (step S82). If FMUDAFIN is equal to "1", which indicates that the measurement of the dead time period TNR is completed, the process proceeds to step S83.

If FMUDAFIN is not equal to "1" (or in some embodiments equal to "0"), which indicates that the measurement of the dead time period TNR is not completed, it is determined whether or not the value of the timer TLMT is greater than or equal to a predetermined upper limit TMLMT (e.g., 15 sec) (step S84). If the answer to step S84 is negative (NO), the process proceeds to step S86. If TLMT is greater than or equal to TMLMT, the interruption flag FTLMT is set to "1" (step S85).

According to the process of FIG. 9, the interruption flag FTLMT is set to "1" when the elapsed time from the time of starting the lean operation for deterioration determination of the O2 sensor 15 becomes greater than or equal to the predetermined upper limit TMLMT.

FIG. 10 is a flowchart of the reentry determination process executed in step S45 shown in FIG. 6.

In step S91, it is determined whether or not the first step end flag FSTEP1FIN is "1". Since FSTEP1FIN is equal to "0" initially, the process proceeds to step S92, in which the hold flag FHOLD is set to "0". Subsequently, the reentry flag FRETRY is set to "0" (step S96).

If the deterioration determination in the process of FIG. 4 is withheld to set the first step end flag FSTEP1FIN to "1" (step S24 in FIG. 4), the process proceeds from step S91 to step S93, in which it is determined whether or not the hold flag FHOLD is "1". Since FHOLD is equal to "0" initially, both of the hold flag FHOLD and the reentry flag FRETRY are set to "1" (steps S94 and S95).

After execution of step S94, the answer to step S93 in the next cycle becomes affirmative (YES), and the process proceeds to step S96 to return the reentry flag FRETRY to "0".

According to the process of FIG. 10, the reentry flag FRETRY is initially set to "0", and when the deterioration determination is withheld in the process of FIG. 4, the reentry flag FRETRY is set to "1". Accordingly, the execution condition flag FMCND is set to "0" at the next execution timing of the process shown in FIGS. 6 and 7, and the deterioration determination ends. In the next execution of the process of FIG. 6, the reentry flag FRETRY is immediately returned to "0" in the reentry determination process of FIG. 10, which is a subroutine included in the process of FIG. 6, so that the deterioration determination can be executed again.

FIG. 11 is a flowchart of the dead time period measurement process executed in step S13 shown in FIG. 4.

In step S101, it is determined whether or not the AF lean flag FAFLEAN is "1". If the answer to step S101 is negative (NO), the TNR measurement end flag FMUDAFIN is set to "0" (step S103). Thereafter, the dead time period TNR is set to "0", and the value of an upcount timer TNRT is reset to "0" (step S104).

If FAFLEAN is equal to "1," in step S101, which indicates that the engine 1 is in a lean operating condition, it is determined whether or not the target equivalent ratio KCMD is less than or equal to the lean predetermined value KOSO2L (step S102). If the answer to step S102 is negative (NO), the process proceeds to step S103. If the target equivalent ratio KCMD has reached the lean predetermined value KOSO2L, the process proceeds to step S105, in which it is determined whether or not the TNR measurement end flag FMUDAFIN is "1". Since FMUDAFIN is equal to "0" initially, the process proceeds to step S106 to store the value of the timer TNRT as the dead time period TNR. Thereafter, it is determined whether or not the O2 sensor output SVO2 is less than or equal to the first predetermined voltage SVO2W (step S108). If the answer to step S108 is negative (NO), the process ends.

If the answer to step S108 is affirmative (YES), that is, if the O2 sensor output SVO2 has reached the first predetermined voltage SVO2W, the process proceeds from step S108 to step S109, in which the TNR measurement end flag FMUDAFIN is set to "1".

After execution of step S109, the answer to step S105 becomes affirmative (YES), and the value of the timer TNRT is reset to "0" (step S107).

According to the process of FIG. 11, the dead time period TNR from the time of starting the air-fuel ratio lean operation for deterioration determination of the O2 sensor 15 (the time the target equivalent ratio KCMD has reached the lean predetermined value KOSO2L) to the time the O2 sensor output SVO2 reaches the first predetermined voltage SVO2W, is measured.

Figure 12:
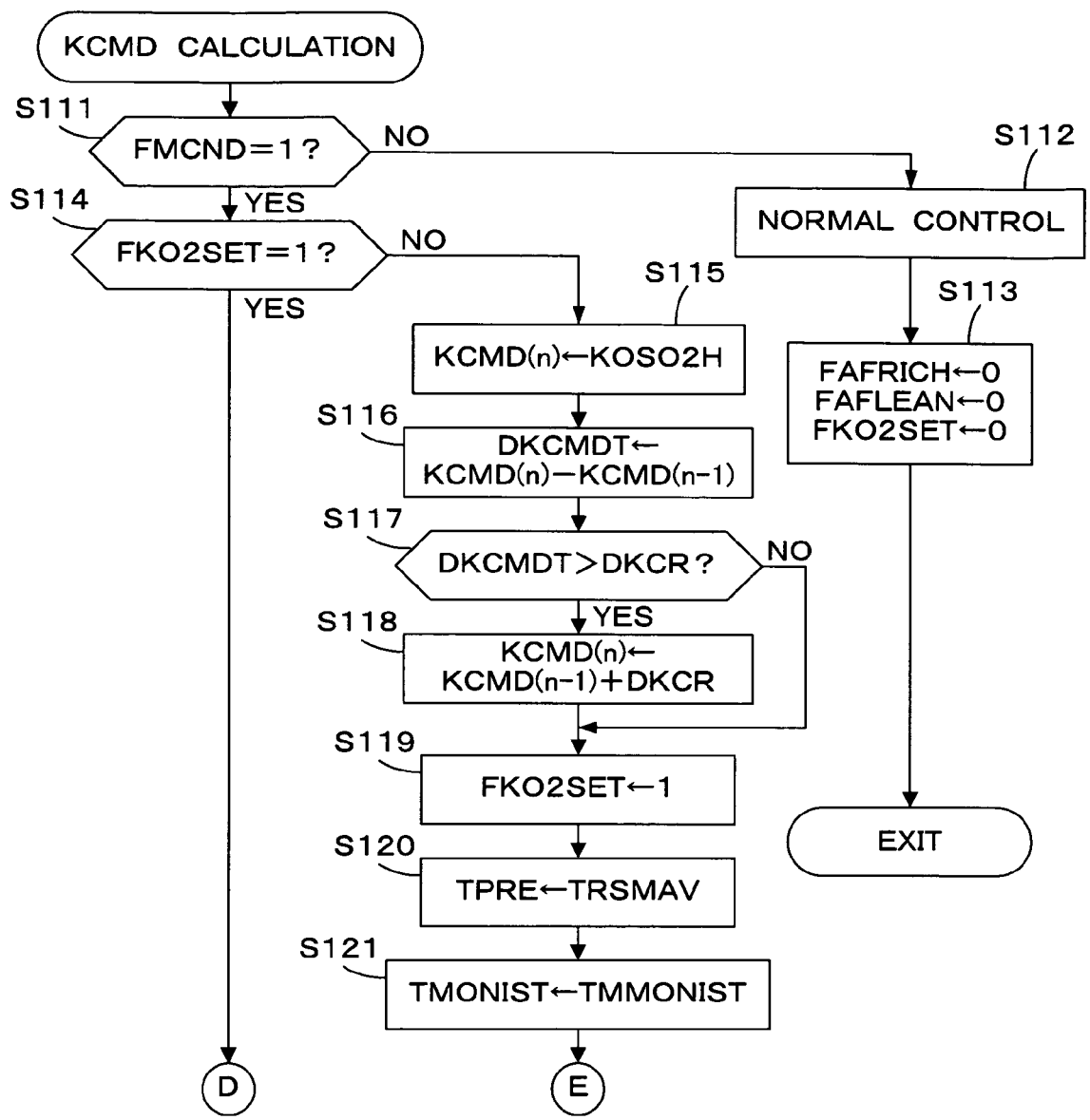
FIGS. 12 and 13 are flowcharts showing a process for calculating a target equivalent ratio (KCMD)
Figure 13:
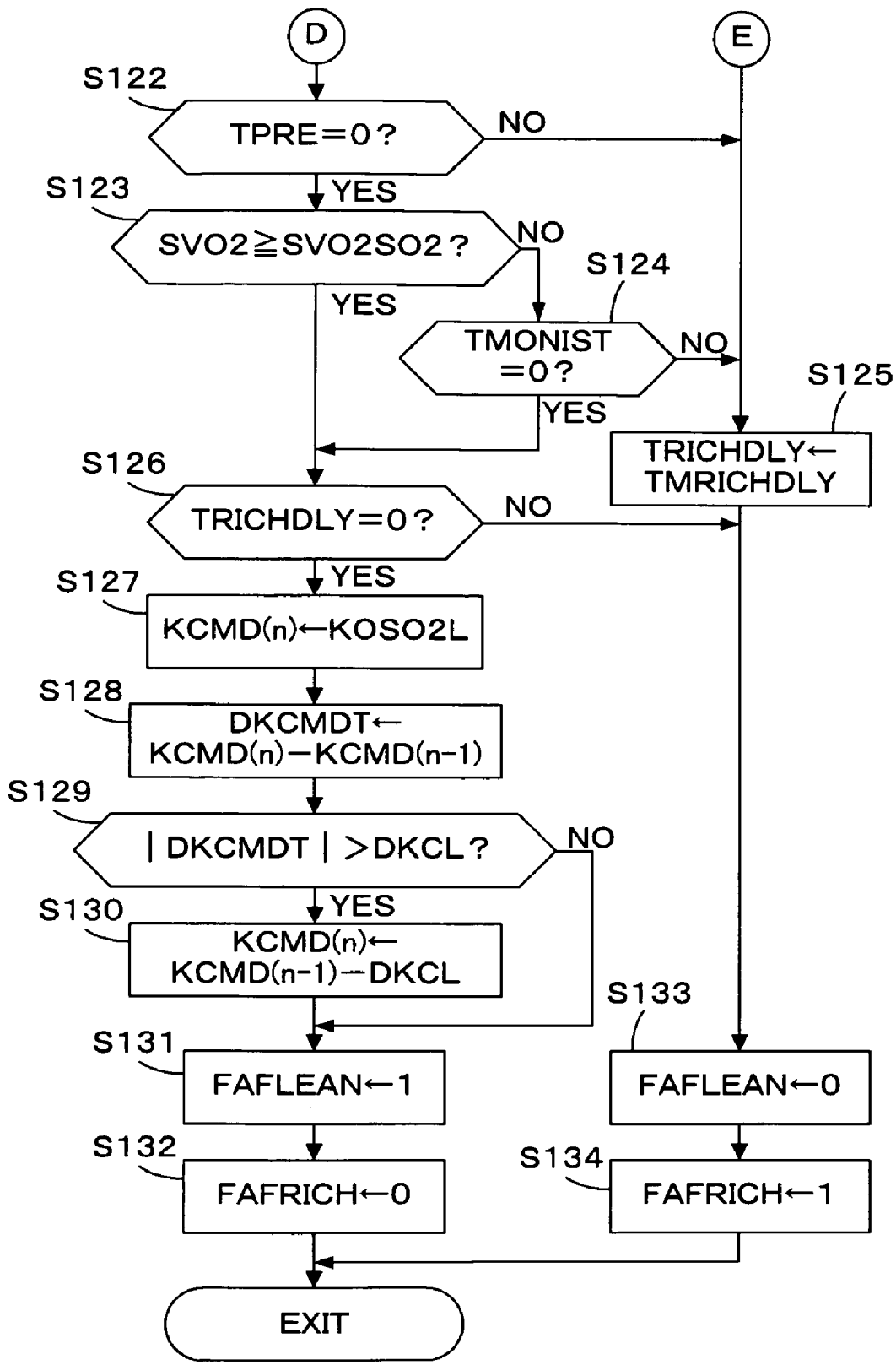

FIGS. 12 and 13 are flowcharts showing a process for setting the target equivalent ratio KCMD. This process is executed by the CPU of the ECU 5 in synchronism with the generation of a TDC pulse.

In step S111, it is determined whether or not the execution condition flag FMCND is "1". If FMCND is not equal to "1" (or in some embodiments equal to "0"), which indicates that the execution condition is not satisfied, normal control is performed (step S112). That is, the target equivalent ratio KCMD is set according to the engine operating conditions. Basically, the target equivalent ratio KCMD is calculated according to the engine rotational speed NE and the absolute intake pressure PBA. In the condition where the engine coolant temperature TW is low or in a predetermined high-load operating condition, the set value of the target equivalent ratio KCMD is changed according to these conditions.

In step S113, the AF rich flag FAFRICH, AF lean flag FAFLEAN, and AF set flag FKO2SET are all set to "0".

When the execution condition is satisfied and the execution condition flag FMCND is set to "1", the process proceeds from step S111 to step S114, in which it is determined whether or not the AF set flag FKO2SET is "1". Since FKO2SET is equal to "0" initially, the process proceeds to step S115, in which the present value KCMD(n) for the target equivalent ratio is set to the rich predetermined value KOSO2H. Thereafter, the preceding value KCMD(n-1) is subtracted from the present value KCMD(n) of the target equivalent ratio to thereby calculate a change amount DKCMDT (step S116). In step S117, it is determined whether or not the change amount DKCMDT is greater than a change limit value KDCR (e.g., 0.000977). If the answer to step S117 is affirmative (YES), the present value KCMD(n) of the target equivalent ratio is changed to a value obtained by adding the change limit value DKCR to the preceding value KCMD(n-1) (step S118). Accordingly, a rapid change in the target equivalent ratio KCMD can be prevented. If DKCMDT is less than or equal to DKCR in step S117, the process proceeds directly to step S119.

The change limit value DKCR may be set according to the engine rotational speed NE. Specifically, the change limit value DKCR may be set so that it decreases with an increase in the engine rotational speed NE.

In step S119, the AF set flag FKO2SET is set to "1". Thereafter, a downcount timer TPRE is set to a predetermined time period TRSMAV (e.g., 2 sec) and then started (step S120). The downcount timer TPRE is referred to in step S122 described below.

In step S121, a downcount timer TMONIST is set to a predetermined time TMMONIST (e.g., 5 sec) and then started. The downcount timer TMONIST is referred to in step S124 described below. In step S125, a downcount timer TRICHDLY is set to a predetermined time TMRICHDLY (e.g., 0.3 sec) and then started. The downcount timer TRICHDLY is referred to in step S126 described below. Thereafter, the AF lean flag FAFLEAN is set to "0", and the AF rich flag FAFRICH is set to "1" (steps S133 and S134). Then, this process ends.

After execution of step S119, the answer to step S114 becomes affirmative (YES), so that the process proceeds to step S122, in which it is determined whether or not the value of the timer TPRE started in step S120 has become "0". If TPRE is greater than "0", the process proceeds to step S125. If TPRE is equal to "0", the process proceeds to step S123, in which it is determined whether or not the O2 sensor output SVO2 is greater than or equal to a third predetermined voltage SVO2SO2 (e.g., 0.6 V). If the answer to step S123 is affirmative (YES), the process proceeds directly to step S126. If SVO2 is less than SVO2SO2, it is determined whether or not the value of the timer TMONIST started in step S121 has become "0" (step S124). If TMONIST is greater than "0", the process proceeds to step S125. If TMONIST is equal to "0", the process proceeds to step S126.

In step S126, it is determined whether or not the value of the timer TRICHDLY started in step S125 has become "0". If TRICHDLY is greater than "0", the process proceeds to step S133 to continue the rich operation. If TRICHDLY is equal to "0", the present value KCMD(n) of the target equivalent ratio is set to the lean predetermined value KOSO2L (step S127).

Thereafter, the preceding value KCMD(n-1) of the target equivalent ratio is subtracted from the present value KCMD(n) to thereby calculate the change amount DKCMDT (step S128). In step S129, it is determined whether or not the absolute value of the change amount DKCMDT is greater than a change limit value DKCL (e.g., 0.000977). If the answer to step S129 is affirmative (YES), the present value KCMD(n) of the target equivalent ratio is changed to a value obtained by subtracting the change limit value DKCL from the preceding value KCMD(n-1) (step S130). Accordingly, a rapid change in the target equivalent ratio KCMD can be prevented. If |DKCMDT| is less than or equal to DKCL in step S129, the process proceeds directly to step S131.

The change limit value DKCL may be set according to the engine rotational speed NE. Specifically the change limit value DKCL may be set so that it decreases with an increase in the engine rotational speed NE.

In step S131, the AF lean flag FAFLEAN is set to "1", and the AF rich flag AFRICH is returned to "0" (step S132). Then, this process ends.

According to the process of FIGS. 12 and 13, when the execution condition for the deterioration determination is satisfied, the target equivalent ratio KCMD is gradually changed to the rich predetermined value KOSO2H, and the rich operation for setting the air-fuel ratio to a rich air-fuel ratio with respect to the stoichiometric ratio is performed over the rich set time period TRICH. In this process, the rich set time period TRICH is in the range between (TRMAV+ TMRICHDLY) and (TRMAV+TMRICHDLY+TMMON-IST).

In this embodiment, the LAF sensor 14 and the O2 sensor 15 correspond respectively to the upstream oxygen concentration sensor and the downstream oxygen concentration sensor, and the fuel injection valves 6 constitute a part of the rich air-fuel ratio setting means and the air-fuel ratio changing means. The ECU 5 constitutes the execution condition determination means, a part of the rich air-fuel ratio setting means and the air-fuel ratio changing means, the dead time period measuring means, the determination threshold setting means, the change time period measuring means, and the deterioration determining means. More specifically, the process of FIGS. 6 and 7 corresponds to the execution condition determination means, steps S111 and S114 to S119 in FIGS. 12 and 13 correspond to the rich air-fuel ratio setting means, steps S120 to S130 in FIG. 13 correspond to the air-fuel ratio changing means, the process of FIG. 11 corresponds to the dead time period measuring means, step S16 in FIG. 4 corresponds to the determination threshold setting means, steps S14, S15, and S17 in FIG. 4 correspond to the change time period measuring means, and steps S19 to S24 in FIG. 4 correspond to the deterioration determining means.

Figure 2:
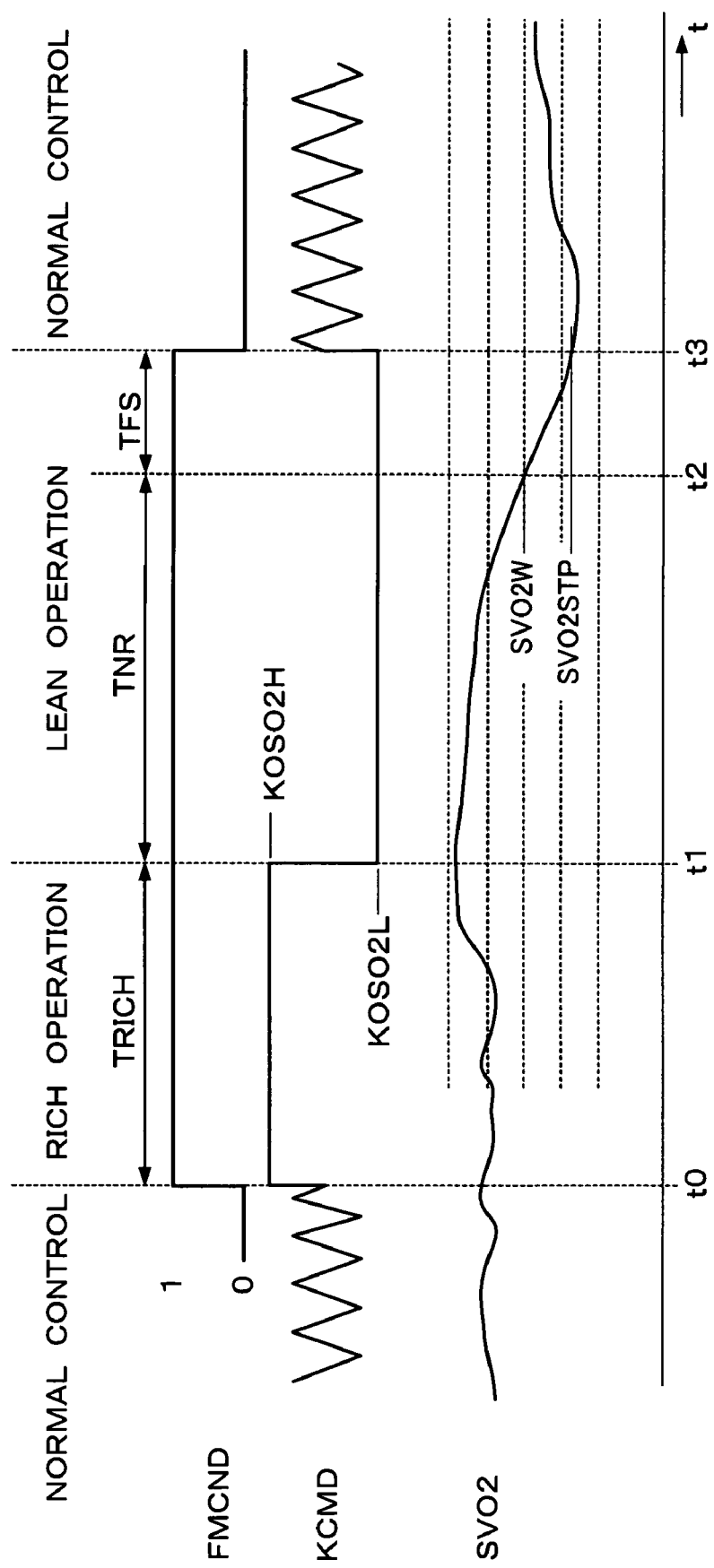
FIG. 2 is a time chart for illustrating a deterioration determination method according to the present invention.

The present invention is not limited to the above preferred embodiment, but various modifications may be made. For example, according to the process of FIGS. 12 and 13, the change amount of the target equivalent ratio KCMD is limited upon changing the target equivalent ratio KCMD (steps S116 to S118 and S128 to S130). However, such limit process may be omitted. FIG. 2 corresponds to such a case that the limit process is not performed.

Further, in the above-described embodiment, the time period from the time (t1 in FIG. 2) the target equivalent ratio KCMD (target air-fuel ratio) is changed to the lean predetermined value KOSO2L to the time (t2 in FIG. 2) the O2 sensor output SVO2 decreases to the first predetermined voltage SVO2W, is measured as the dead time period TNR. Alternatively, as shown in FIG. 14, the time period from time t1a when the output PVO2 from the LAF sensor 14 is changed to a value indicative of a lean air-fuel ratio with a slight delay from time t1 to the time (t2) the O2 sensor output SVO2 decreases to the first predetermined voltage SVO2W, may be measured as a dead time period TNRa. In such case, the upper determination threshold TSVOH and the lower determination threshold TSVOL may be set according to the dead time period TNRa.

Further, the LAF sensor 14 may be replaced with an oxygen concentration sensor having characteristics similar to those of the O2 sensor 15, and this oxygen concentration sensor may be used as the upstream oxygen concentration sensor.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A deterioration detecting device for detecting deterioration of a downstream oxygen concentration sensor disposed downstream of a catalyst which is provided in an exhaust passage of an internal combustion engine to purify exhaust gases, said catalyst having a capability of storing oxygen, said deterioration detecting device comprising:

execution condition determining means for determining an execution condition for deterioration determination of said downstream oxygen concentration sensor;

rich air-fuel ratio setting means for setting an air-fuel ratio of an air-fuel mixture to be supplied to said engine to a predetermined rich air-fuel ratio in a rich region with respect to a stoichiometric ratio when the execution condition is satisfied;

air-fuel ratio changing means for changing the air-fuel ratio to a predetermined lean air-fuel ratio in a lean region with respect to the stoichiometric ratio when a predetermined enrichment time period has elapsed from the time of enrichment of the air-fuel ratio by said rich air-fuel ratio setting means;

dead time period measuring means for measuring a dead time period from the time the air-fuel ratio has been changed by said air-fuel ratio changing means to the time an output from said downstream oxygen concentration sensor reaches a first predetermined value;

determination threshold setting means for setting a determination threshold according to the dead time period;

change time period measuring means for measuring a change time period from the time the output from said downstream oxygen concentration sensor has reached the first predetermined value to the time the output from said downstream oxygen concentration sensor reaches a second predetermined value indicative of an oxygen concentration higher than an oxygen concentration corresponding to the first predetermined value; and deterioration determining means for determining that said downstream oxygen concentration sensor is deteriorated when the change time period is greater than the determination threshold.

2. A deterioration detecting device according to claim 1, further comprising an upstream oxygen concentration sensor disposed upstream of said catalyst, wherein said dead time period measuring means starts measuring the dead time period at the time the output from said upstream oxygen concentration sensor has changed to a value indicative of a lean air-fuel ratio with respect to the stoichiometric ratio after the air-fuel ratio is changed by said air-fuel ratio changing means.

3. A deterioration detecting device according to claim 1, wherein said determination threshold setting means sets an upper determination threshold and a lower determination threshold which is less than the upper determination threshold, according to the dead time period, and said deterioration determining means determines that said downstream oxygen concentration sensor is deteriorated when the change time period is greater than the upper determination threshold, determines that the downstream oxygen concentration sensor is normal when the change time period is less than the lower determination threshold, and withholds the determination when the change time period is in a range between the lower determination threshold and the upper determination threshold.

4. A deterioration detecting device according to claim 3, wherein the deterioration determination by said rich air-fuel ratio setting means, said air-fuel ratio changing means, said dead time period measuring means, said determination threshold setting means, and said deterioration determining means is executed again, when the determination is withheld and the execution condition is thereafter satisfied.

5. A deterioration detecting method for detecting deterioration of a downstream oxygen concentration sensor disposed downstream of a catalyst which is provided in an exhaust passage of an internal combustion engine to purify exhaust gases, said catalyst having a capability of storing oxygen, said deterioration detecting method comprising the steps of:
   a) determining an execution condition for deterioration determination of said downstream oxygen concentration sensor;
   b) setting an air-fuel ratio of an air-fuel mixture to be supplied to said engine to a predetermined rich air-fuel ratio in a rich region with respect to a stoichiometric ratio when the execution condition is satisfied;
   c) changing the air-fuel ratio to a predetermined lean air-fuel ratio in a lean region with respect to the stoichiometric ratio when a predetermined enrichment time period has elapsed from the time of enrichment of the air-fuel ratio in said step b);
   d) measuring a dead time period from the time the air-fuel ratio has been changed in said step c) to the time an output from said downstream oxygen concentration sensor reaches a first predetermined value;
   e) setting a determination threshold according to the dead time period;
   f) measuring a change time period from the time the output from said downstream oxygen concentration sensor has reached the first predetermined value to the time the output from said downstream oxygen concentration sensor reaches a second predetermined value indicative of an oxygen concentration higher than an oxygen concentration corresponding to the first predetermined value; and
   g) determining that said downstream oxygen concentration sensor is deteriorated when the change time period is greater than the determination threshold.

6. A deterioration detecting method according to claim 5, wherein said exhaust passage is provided with an upstream oxygen concentration sensor disposed upstream of said catalyst, and said step d) of measuring the dead time period is started at the time the output from said upstream oxygen concentration sensor has changed to a value indicative of a lean air-fuel ratio with respect to the stoichiometric ratio after the air-fuel ratio change is changed to the predetermined lean air-fuel ratio.

7. A deterioration detecting method according to claim 5, wherein an upper determination threshold and a lower determination threshold which is less than the upper determination threshold, are set according to the dead time period, and
   it is determined that said downstream oxygen concentration sensor is deteriorated when the change time period is greater than the upper determination threshold, it is determined that said downstream oxygen concentration sensor is normal when the change time period is less than the lower determination threshold, and the determination is withheld when the change time period is in a range between the lower determination threshold and the upper determination threshold.

8. A deterioration detecting method according to claim 7, wherein the deterioration determination by said steps b) to g) is executed again, when the determination is withheld and the execution condition is thereafter satisfied.

9. A computer program recorded on a computer-readable medium which, when executed, is adapted to carry out a deterioration detecting program for detecting deterioration of a downstream oxygen concentration sensor disposed downstream of a catalyst which is provided in an exhaust passage of an internal combustion engine to purify exhaust gases, said catalyst having a capability of storing oxygen, said deterioration detecting program comprising the steps of:
   a) determining an execution condition for deterioration determination of said downstream oxygen concentration sensor;
   b) setting an air-fuel ratio of an air-fuel mixture to be supplied to said engine to a predetermined rich air-fuel ratio in a rich region with respect to a stoichiometric ratio when the execution condition is satisfied;
   c) changing the air-fuel ratio to a predetermined lean air-fuel ratio in a lean region with respect to the stoichiometric ratio when a predetermined enrichment time period has elapsed from the time of enrichment of the air-fuel ratio in said step b);
   d) measuring a dead time period from the time the air-fuel ratio has been changed in said step c) to the time an output from said downstream oxygen concentration sensor reaches a first predetermined value;
   e) setting a determination threshold according to the dead time period;
   f) measuring a change time period from the time the output from said downstream oxygen concentration sensor has reached the first predetermined value to the time the output from said downstream oxygen concentration sensor reaches a second predetermined value indicative of an oxygen concentration higher than an oxygen concentration corresponding to the first predetermined value; and
   g) determining that said downstream oxygen concentration sensor is deteriorated when the change time period is greater than the determination threshold.

10. A computer program according to claim 9, wherein said exhaust passage is provided with an upstream oxygen concentration sensor disposed upstream of said catalyst, and said step d) of measuring the dead time period is started at the time the output from said upstream oxygen concentration sensor has changed to a value indicative of a lean air-fuel ratio with respect to the stoichiometric ratio after the air-fuel ratio change is changed to the predetermined lean air-fuel ratio.

11. A computer program according to claim 9, wherein an upper determination threshold and a lower determination threshold which is less than the upper determination threshold, are set according to the dead time period, and
   it is determined that said downstream oxygen concentration sensor is deteriorated when the change time period is greater than the upper determination threshold, it is determined that said downstream oxygen concentration sensor is normal when the change time period is less than the lower determination threshold, and the determination is withheld when the change time period is in a range between the lower determination threshold and the upper determination threshold.

12. A computer program according to claim 11, wherein the deterioration determination by said steps b) to g) is executed again, when the determination is withheld and the execution condition is thereafter satisfied.

* * * * *